United States Patent [19]

Faillace

[11] E Patent Number: Re. 31,903

[45] Reissued Date of Patent: Jun. 4, 1985

[54] EXTRUDER TEMPERATURE CONTROLLER

[75] Inventor: Louie M. Faillace, Pawcatuck, Conn.

[73] Assignee: Crompton & Knowles Corporation, Parsippany, N.J.

[21] Appl. No.: 484,689

[22] Filed: Apr. 13, 1983

Related U.S. Patent Documents

Reissue of:

[64] Patent No.: 4,262,737
Issued: Apr. 21, 1981
Appl. No.: 48,974
Filed: Jun. 15, 1979

[51] Int. Cl.[3] ..... F28F 27/00; B29F 3/00; G05D 23/22

[52] U.S. Cl. ..... 165/12; 165/30; 236/78 B; 264/40.6; 366/145; 425/144

[58] Field of Search ..... 165/12, 27, 30; 264/40.6; 236/78 B; 366/145, 146, 79; 425/143, 144

[56] References Cited

U.S. PATENT DOCUMENTS

| | | | |
|---|---|---|---|
| 2,508,988 | 5/1950 | Bradley | 165/30 |
| 3,698,844 | 10/1972 | Grimm | 425/144 |
| 3,728,058 | 4/1973 | Wheeler | 425/144 |
| 3,733,059 | 5/1973 | Pettit | 425/143 X |
| 3,751,014 | 8/1973 | Waterloo | 165/30 |
| 3,822,867 | 7/1974 | Evans | 425/144 X |
| 3,826,305 | 7/1974 | Fishman | 165/26 |
| 3,866,669 | 2/1975 | Gardiner | 165/27 |
| 4,071,745 | 1/1978 | Hall | 165/22 |
| 4,072,185 | 2/1978 | Nelson | 165/30 |
| 4,097,723 | 6/1978 | Leitner | 219/494 |
| 4,197,070 | 4/1980 | Koschmann | 264/40.6 X |
| 4,197,070 | 4/1980 | Koschmann | 425/135 |
| 4,272,466 | 6/1981 | Harris | 264/40.6 |

FOREIGN PATENT DOCUMENTS 1056593 1/1967 United Kingdom .

OTHER PUBLICATIONS

Turnbull, Cascade Control of Melt Temperature for Extruding and Injection Moulding Machines. J of IFAC presented at IFAC/PRP Brussels, May 1971.

"System 200 Operating Manual" Crompton and Knowles, Dec. 3, 1976.

"Anticipatory Temperature Control of Extruders" Stewart E. Walton, Davis-Standard Div., Crompton and Knowles, Delivered at 47th Annual Convention of the Wire Association International, Inc., Oct. 16-20, 1977, Boston, Mass.

H. E. Harris, "Depth of Sensors in Extruder Barrels," Society of Plastics Engineers, 35th Annual Technical Conf. Montreal, Canada, Apr. 25-28, 1977.

Don Morgan, "Temperature Control on Machinery For Extrusion of Plastics and Rubber," Eurotherm, 1971, pp. 29-36.

Richard K. West, "Advantages of Dual Thermocouples in Injection Cylinders and Extrusion Barrels," Society of Plastics Engineers Journal, vol. 13, No. 4, Apr. 1957.

Fenwal Incorporated, "How to Get Better Temperature Control," 1961, Revised, 1975.

R. F. Bayless, "Three-mode Pretuning of Temperature Controllers," *Plastics Engineering*, Mar. 1978 pp. 59-62.

"Modicon 184/384 Controller User's Manual," Aug. 1976.

*Primary Examiner*—Sheldon J. Richter

[57] ABSTRACT

A plastic extruder system having a barrel and a shell with heat exchange elements surrounding the barrel is disclosed. Two thermocouples are provided, one for sensing the temperature of the inner surface of the barrel and the other for sensing the temperature of the shell. A system controller, into which a desired barrel setpoint temperature can be set and stored, receives and stores the independent temperature signals from the thermocouples and controls the heat exchange elements to automatically maintain the temperature of the extruder barrel close to the desired barrel setpoint temperature.

22 Claims, 22 Drawing Figures

TEMPERATURE FLUCTUATIONS OF SYSTEM INCLUDING CONTROLLER ACCORDING TO PRESENT INVENTION

EXTRUDER TEMPERATURE CONTROLLER

Matter enclosed in heavy brackets [ ] appears in the original patent but forms no part of this reissue specification; matter printed in italics indicates the additions made by reissue.

*This application is a reissue of Ser. No. 048,974, filed June 15, 1979, now U.S. Pat. No. 4,262,137.*

This invention relates to extrusion apparatus for plastic materials and the like.

In particular, the invention relates to the control of the operating temperature of an extruder barrel in a system which includes a shell surrounding the barrel and providing heat exchange elements for exchanging heat with the extruder barrel. The invention is particularly suited to a system employing water as a liquid coolant, although it is also applicable to a system employing only heater elements, to a system employing coolants other than water, or to an air cooled system.

Extruder systems employing one or more pairs of temperature probes (thermocouples), located one at the inner surface of the extruder barrel, and one within the shell surrounding the barrel, are described for example in U.S. Pat. No. 3,866,669 to Gardiner, and U.S. Pat. No. 3,751,014 to Waterloo. In both of these systems, the electrical signals from the two thermocouples of the pair are electrically combined (as shown particularly in FIG. 4 of U.S. Pat. No. 3,751,014) to provide an average value, which may be weighted appropriately. The average value is input to the controller of the system which employs it together with a setpoint value to derive output control signals. The control signals are applied to the controls of the heat exchange elements to control the barrel temperatures.

Although the systems of these patents have been widely used, they are deficient in a number of respects.

For example, in the systems of the prior art, after the system has stabilized, there usually exists a difference between the actual operating temperature and the reference temperature (set point) set into the system by the operator. This difference is known as "droop". Operators of the system have been obliged to input a new reference temperature, empirically selected on the basis of experience and judgment, and to wait further until the system restabilizes to find out whether a major portion of droop has been eliminated and the operating temperature is now satisfactorily close to the desired set temperature. Sometimes several steps have been required, requiring considerable time before use of the system could commence.

Furthermore, in previously known systems, the temperature of the heat exchange element has either not been individually sensed or has not been independently input and stored and hence has been unavailable for use by the controller. As a result, it was impossible in the prior art systems to utilize evaporative cooling, when operating at temperatures close to the flash point of the coolant (generally water), in order to take advantage of the heat of vaporization of the coolant, to increase the cooling capacity of a given volume of coolant and thereby to increase the efficiency of operation.

Accordingly, it is a major object of the present invention to provide a novel system which automatically resets itself to substantially reduce the droop problem, providing an actual temperature much more nearly equal to the setpoint temperature.

It is another object of the invention to provide a novel system which makes it possible to take advantage of evaporative cooling.

It is a further object of the invention to provide automatic heater protection, disabling any heater whose temperature exceeds a safe limit of operation.

These and other objects have been accomplished by the present invention, by providing, in a plastic extruder system having a barrel and a shell surrounding the barrel, and having a heat exchange element which may include both heating and cooling elements, at least one pair of temperature sensitive elements, one of the pair being placed to sense the temperature at the inner surface of the barrel, the other of the pair being placed to sense the temperature of the shell.

More specifically, the improvement of the present invention comprises a controller having temperature signal input means for receiving an independent temperature signal from each of the pair of temperature sensitive elements, setpoint signal input means for inputting a setpoint signal representative of a desired barrel temperature, and storage means for independently storing each of the input independent temperature signals and the input setpoint signal. Control means responsive to the stored setpoint signal and each of the stored temperature signals controls the heat exchange element to maintain the temperature of the barrel close to the setpoint temperature.

In preferred embodiments, the storage means further provides at least one gain signal, and a set of signals representative of a plurality of heater and cooler duty cycle times and heater and cooler on-times. The controller further may have means responsive to the stored input setpoint signal; the stored gain signal, and each of the stored input independent temperature signals to derive indexing signals, indexing means for applying the indexing signals to the storage means to select certain of the stored duty cycle time signals and heater and cooler on-time signals, and output means for outputting the selected signals to control the heat exchange element power control means. The temperature of the extruder barrel is thereby maintained close to the input setpoint temperature.

Several advantages are provided by the invention. The system is highly responsive to changes in operating conditions, and in effect anticipates changes of temperature in the barrel before they occur. As a result, the system is highly energy-efficient.

Because the shell temperature is sensed separately from that of the barrel and the resultant signal is independently stored, the system can provide automatic flash point compensation and improved cooling response, as well as automatic heater protection.

Figures 17A, 17B:
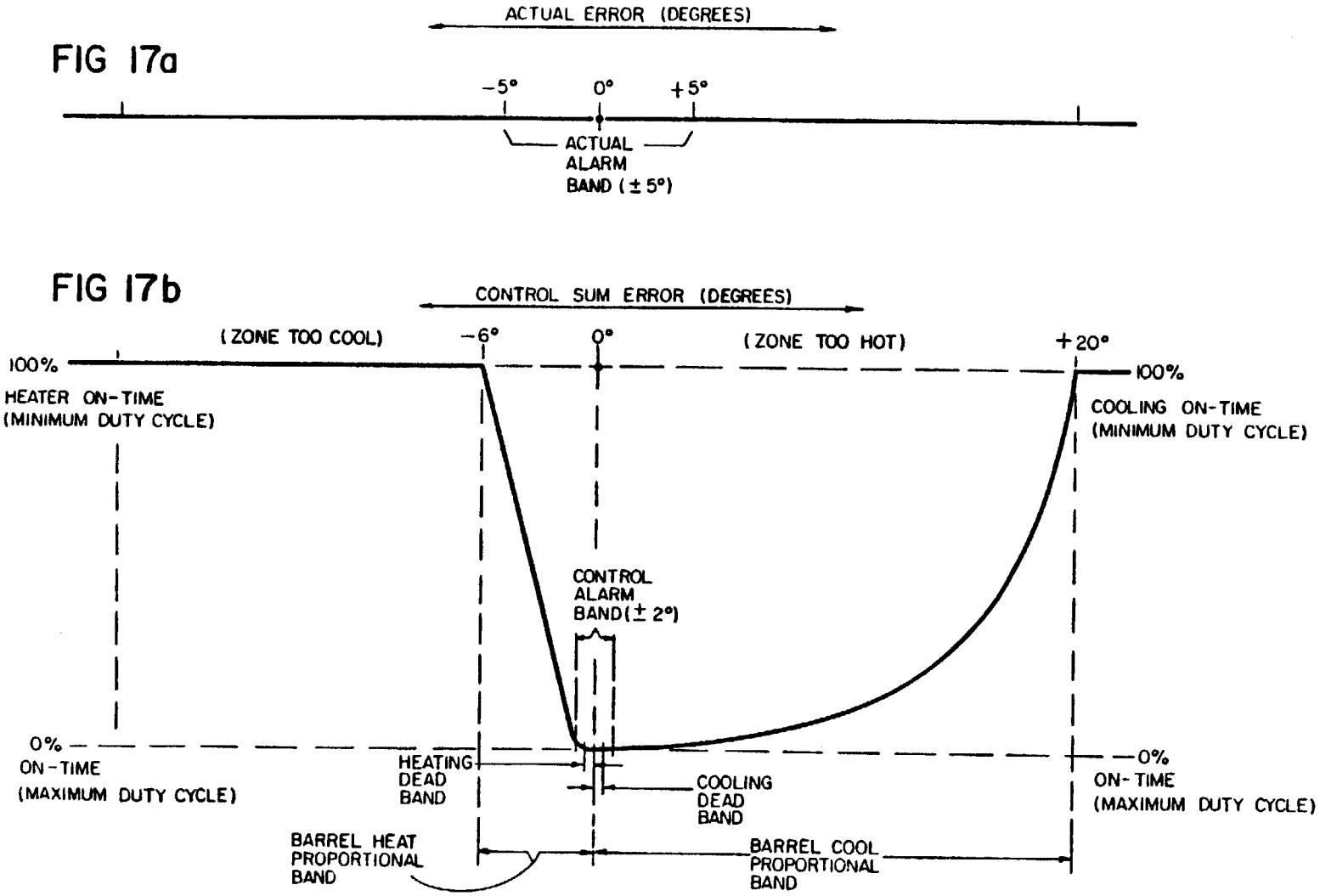
Figure 18B:
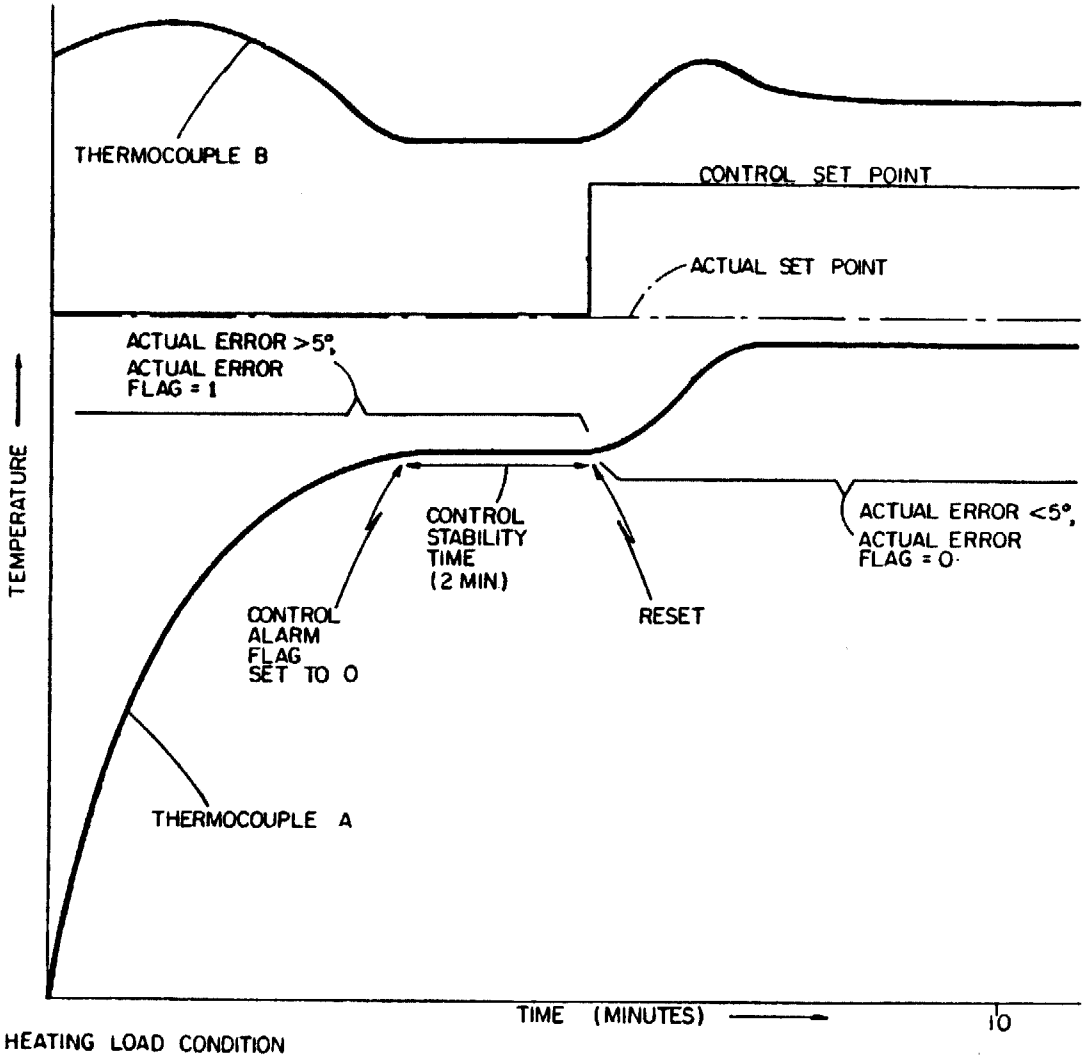
Figure 18A:
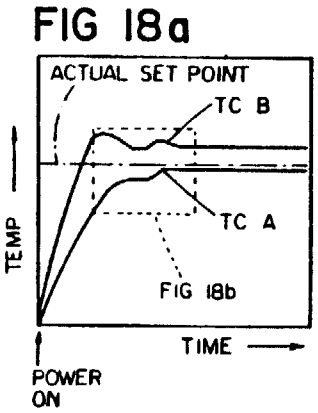
Figure 19:
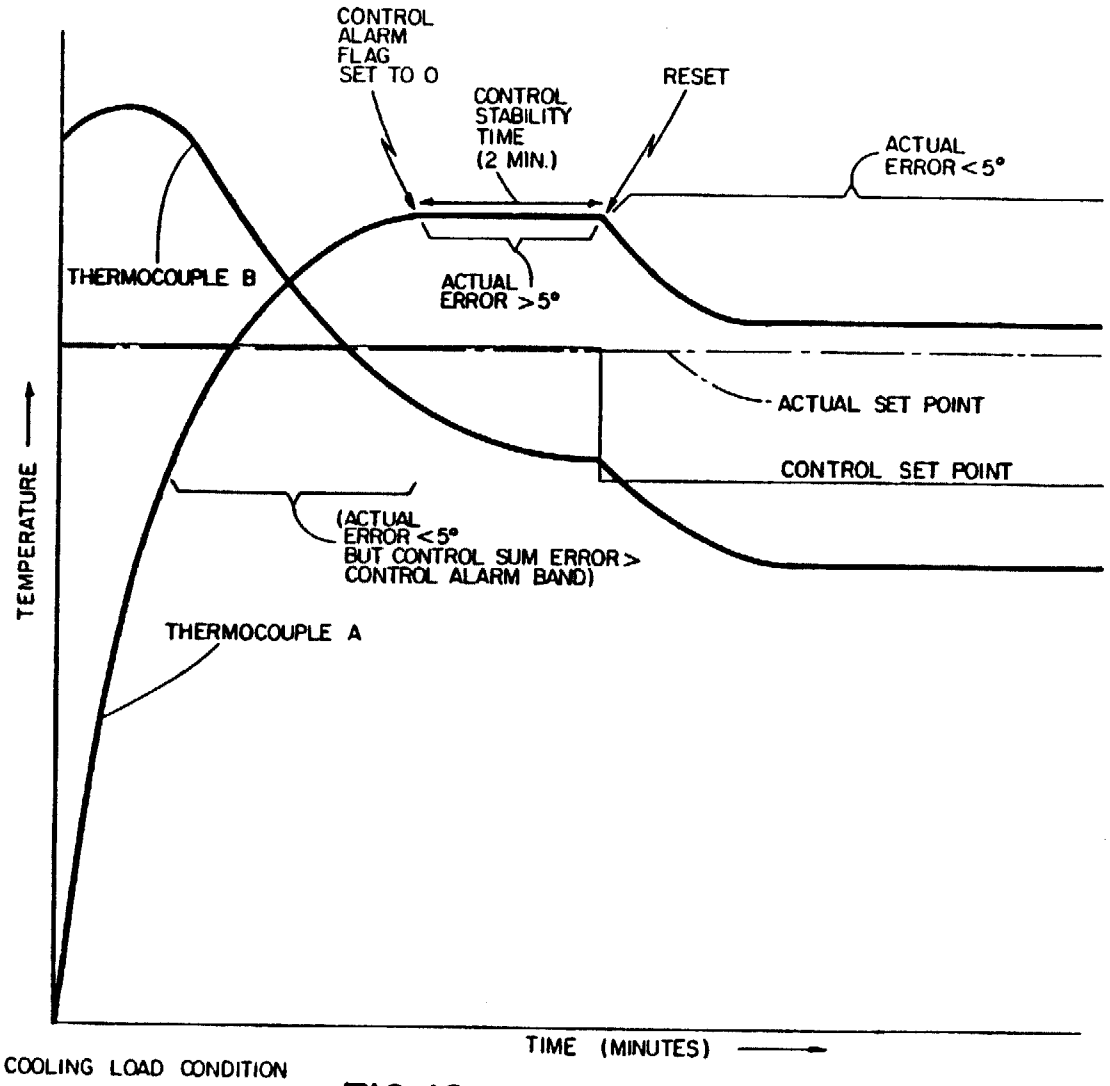

FIGS. 17a and b show certain control parameters used in the controller in relation to zero error conditions;

FIGS. 18a and b show the relationship between time and temperatures measured by each of the thermocouple pair, together with certain parameters, during approach to operating temperature stability, for a heating load condition; and FIG. 19 is similar to FIG. 18b, for a cooling load condition.

DESCRIPTION OF THE INVENTION

In the following description of the invention, a number of terms of art are employed. The following list of definitions of such terms may be helpful in understanding the description.

DEFINITIONS

Alarm band, actual is an arbitrarily selected reference value for each barrel zone, typically ±5°, with which actual error A is compared to determine whether or not to derive the reset signal; it may be set through the keyboard (alarm set points); its signals are stored in Stack 80.

Alarm band, control is an arbitrarily selected reference value for each barrel zone, typically ±°, with which control sum error is compared to determine whether the temperature is stable enough to derive a reset signal; it is hardwired in the system; its signals are stored in Stack 112.

Barrel heat limit is a physical parameter, dependent on the design of heater and system wiring; it is hardwired in the system; its signal is stored in Register 177.

Dead band, cooling is a range of temperature slightly above (typically 1 degree) the no-error condition (at which control sum error=0); its signal is stored in Register 167.

Dead band, heating is a range of temperature slightly below (typically 1 degree) the no-error condition (at which control sum error=0); its signal is stored in Register 154.

Duty cycle is a time period during a portion of which the heater or cooler may be turned on and off once; it is a function of the thermal time constants of the system; its length varies as a function of the error; heating duty cycle typically varies from 15 seconds maximum to 10 seconds minimum; cooling duty cycle typically varies from 10 seconds maximum to 3 seconds minimum.

Error, actual (A or B) is the difference between "actual setpoint" and "actual temperature (A or B)" for each barrel zone; its signal is stored in Stack 54.

Error, control (A or B) is the difference between "control setpoint" and "actual temperature (A or B)" for each barrel zone; its signal is stored in Stack 70.

Error, control sum is the weighted average of control errors A and B for each barrel zone; its signal is stored in Stack 78; control sum error=(K1 A+K2 B)/(K1+K2), where K1 and K2 are weighting factors.

Flag, actual error (or flag, actual alarm)=1 when actual error A is greater than or equal to the actual alarm band width; it=0 where actual error A is less than actual alarm band width, for a given barrel zone; it is represented by bit 1 of Information Stack 82 at the location corresponding to that barrel zone.

Flag, control (or flag, control alarm)=1 when control sum error is greater than or equal to the control alarm band width; it=0 when control sum error is less than the control alarm band width, for a given barrel zone; it is represented by bit 6 of Information Stack 82 at the location corresponding to that barrel zone.

Flag, control sum stability=1 when control error has been less than control alarm band width for a selected time period (typically two minutes), for a given barrel zone; it is represented by bit 7 of Information Stack 82 at the location corresponding to that barrel zone.

Flash point is the temperature at which water evaporates into steam (at sea level, 212 degrees Fahrenheit, 100 degrees Celsius).

Gain, barrel cool is an empirically determined physical parameter related to the cooling load in the system in a given barrel zone; its signals are stored in Stacks 132 or 133; it is hardwired into the system.

Gain, barrel heat is an empirically determined physical parameter related to the heating load in the system in a given barrel zone; its signals are stored in Stack 130; it is hardwired in the system.

Gain, reset is a physical parameter of the extruder system, for each barrel zone, empirically determined when the system and its controller are designed, and is representative of the load at that zone; its signals are stored in Stack 56; it is hardwired in the system.

K1, K2 are constant weighting factors applied to control errors A and B to derive control sum error.

On-time is the portion of the duty cycle during which the heater or cooler is energized; heater on-time typically varies from 2 seconds minimum to 10 seconds maximum; cooler on-time typically varies from 0.1 seconds minimum to 1.0 seconds maximum.

Proportional band, barrel cool is the temperature range (typically 20 degrees) above the no-error condition (at which the control sum error=0 within which cooling on-times will be proportional); its signal is stored in Register 169.

Proportional band, barrel heat is the temperature range (typically 10 degrees) below the no-error condition (at which the control sum error=0 within which heating on-times will be proportional); its signal is stored in Register 158.

Reset, reset correction=(actual error A × reset gain)-+old reset value, for a given barrel zone; its signals are stored in Stack 58.

Setpoint, actual is the desired value of the barrel operating temperature, for a given barrel zone, which is entered through the keyboard; its signals are stored in Stack 52; it is equal to Control Setpoint at power-on and when reset is disabled.

Setpoint, alarm—see alarm band.

Setpoint, control=sum of actual setpoint+reset, for a given barrel zone; it is a derived temperature setpoint used by the controller; at power-on or when reset is disabled, control setpoint is equal to actual setpoint; its signals are stored in Stack 66.

Temperature, actual (A or B) is temperature as measured by the A or B thermocouple (respectively at the barrel inner surface and in the heater/cooler shell) for a given barrel zone; its signals are stored in Stack 48. Note that when temperatures are given in degrees in the following description, degrees Fahrenheit are generally meant; but since the numbers of degrees are given only by way of example, nothing in the description should be taken as limited to operation in degrees Fahrenheit.

Figure 1:
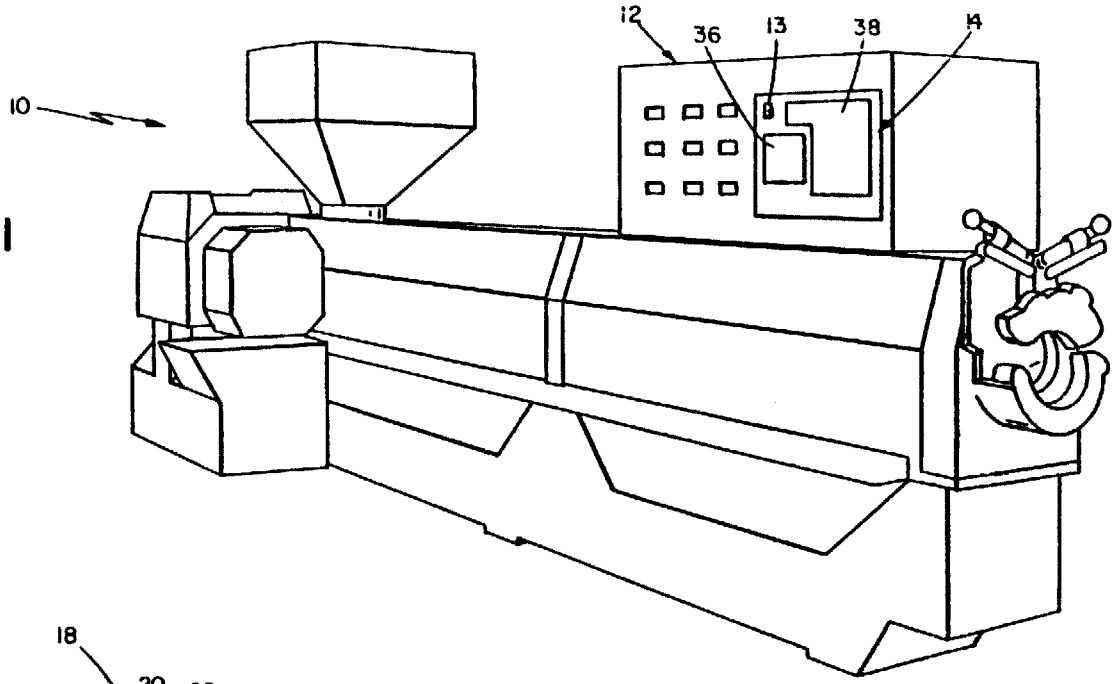
FIG. 1 shows an external view of an extruder system including the controller of the invention.

Referring now to the drawings, FIG. 1 shows an extruder system 10 with a controller 12 according to the invention connected thereto. Controller 12 includes a panel 14 having a keyboard 36 for the input of control signals, and a display 38.

A typical extruder system of the kind to which the controller of the invention is applicable includes an extruder barrel, surrounded by a shell including heater elements and cooling structure, which may be, for example, tubes carrying a coolant, such as water. Alternatively, the cooling structure may comprise a finned shell with a blower to circulate air past the fins. The controller of the invention is applicable to an extruder system having either type of cooling structure. The barrel and shell are divided into a number of zones, and the controller is designed to operate on the selected number of zones. The number is typically eight, but is not critical. A controller according to the present invention can be designed to operate on any selected number of zones.

Figure 2:
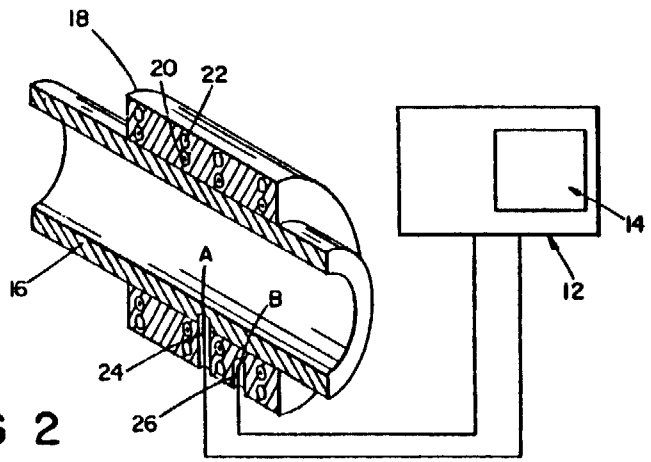
FIG. 2 shows a cross section of a single zone of the extruder barrel and heat exchange element shell, with the placement of a temperature sensing thermocouple pair and their connection to the controller of the invention.

FIG. 2 shows a cross section of a single zone of a water-cooled extruder. The extruder barrel 16 is surrounded by a heater/cooler shell 18, in which are provided heater elements 20 (typically a resistive heating element, such as that sold under the tradename Cal-rod) and tubes 22 for the circulation of cooling water. The heating elements are operated by a conventional power control device, not shown, and the cooling elements are operated by conventional pumps and solenoid valves, also not shown. Two thermocouples per barrel zone are provided, electrically isolated from one another. The thermocouple 24, called the A thermocouple of the pair, is placed at the inner surface of the barrel 16. The thermocouple 26, called the B thermocouple of the pair, is placed in the interior of the heater/cooler shell 18. Each zone of the extruder is similarly provided with a pair of thermocouples, A and B, similarly placed. In an air-cooled extruder system, the B thermocouple is also placed in the interior of the shell.

Before the structure and operation of the controller of the invention is explained in detail, it will be helpful to have a qualitative understanding of the operation of the controller, which will be described with reference particularly to FIGS. 17, 18 and 19.

In general terms, referring first to FIG. 18a, in the case of a heating load, when the extruder system is started up (at power-on), the temperatures measured by each of ,hermocouples A and B in any particular barrel zone begin to rise as heat is input to the system. The difference between the barrel temperature (measured by thermocouple A) and the actual set point is continually measured by the controller, as is the difference between the heater temperature (measured by thermocouple B) and the actual set point. The difference between actual setpoint and the temperature measured by thermocouple A is called the "actual error A", which is compared by the controller with a reference value called the "actual alarm band" (FIG. 17a). When the barrel temperature is equal to the actual set point temperature, the actual error is zero. Unless the actual error exceeds the actual alarm bandwidth, the automatic reset correction will not be made, as will be explained.

A signal called the "control sum error" is derived by the controller from the two measured temperatures. Referring to the left hand portion of FIG. 17b, so long as the "control sum error" signal is greater (in absolute magnitude) than the reference signal called the "barrel heat proportional bandwith", which is six degrees in the embodiment described herein, it is desirable to input as much heat as possible into the system. In this condition the heater control cycles as frequently as possible (minimum duty cycle) and the heater is energized for 100% of the duty cycle. As a result, the heater is on continuously.

Only when the control sum error is found by the controller to be within the barrel heat proportional band will more sensitive control of the heating process be undertaken. As seen in FIG. 17b, when the control sum error is within the barrel heat proportional band, the percentage of the duty cycle during which the heater is energized decreases from 100%, when the control sum error is six degrees, to 0% when the control sum error reaches zero.

In cooling load conditions (FIG. 19 and the right hand portion of FIG. 17b), which might occur, for example, when the rotating screw of the extruder generates frictional heat which raises the barrel temperature above the actual setpoint, the control sum error is compared with the barrel cool proportional bandwidth. So long as the control sum error is greater than the bandwidth, the coolant control cycles as frequently as possible (minimum duty cycle) and the pumps and valves that cause coolant to flow are energized during 100% of the duty cycle. As a result, the cooling apparatus is on continuously.

As seen in FIG. 17b, when the control error is found to be within the barrel cool proportional bandwidth, the percentage of the duty cycle during which the coolant valves and pumps are energized decreases from 100%, when the control sum error is twenty degrees, to 0% when the control sum error is zero. As is seen in FIG. 17b, the relationship between control sum error and on-time for the barrel heat proportional band is quite different from that for the barrel cool proportional band.

Two further reference signals are employed by the controller; as seen in FIG. 17b, the region slightly below the zero-error condition is called the "heating dead band", while that slightly above is called the "cooling dead band." These bandwidths are typically of the order of one degree; while the control sum error is within one degree of the zero-error condition, no correction will be undertaken. A slightly larger region called the "control alarm band", typically ±two degrees, surrounds the zero-error condition. The control sum error is compared with the control alarm bandwidth to determine when the reset correction should be undertaken, as will be explained.

Referring to FIG. 18a, as the system is heated from power-on, the temperature of the heater/cooler shell, as measured by thermocouple B, overshoots the actual set point, while the temperature of the barrel, as measured by thermocouple A, does not reach the actual set point. As seen in detail in FIG. 18b, the system approaches temperature stability (in a heating load condition), but the barrel temperature remains below the actual set point. The system settles down into a stable condition in which the actual error A is greater than five degrees (the actual alarm band width). The controller by comparing the control sum error with the control alarm band detects the condition in which the control sum error remains within the control alarm band for a time interval called "control stability time". The controller then undertakes corrective "reset" action. A "control set point" signal is derived, representing a temperature above the actual set point, and responsive to the control set point, control signals are output to the heater controls to cause the zone to be heated further. As is seen in FIG. 18b, the temperature of the heater/cooler shell (thermocouple B) rises and then decreases slightly to a new level; the temperature of the barrel (thermocouple A) rises to a new level, which is within five degrees of the actual set point (within the actual alarm band). The system is thereafter stable in this new condition, unless operating conditions change.

Referring to FIG. 19, showing the cooling load condition, after start up the temperature of the heater/cooler shell (thermocouple B) decreases as heat is removed from the system, while that of the barrel (thermocouple A) increases to a level more than five degrees above the actual set point. After the control stability time has elapsed, reset correction is undertaken automatically. The controller derives a "control set point" signal, below the actual set point, and responsive to the control set point, control signals are output to the cooler controls to cause the system to be cooled further. The temperature of the heater/cooler shell (thermocouple B) decreases more sharply and then levels off, while the temperature of the barrel (thermocouple A) decreases to a level within five degrees of the actual setpoint (actual error within the actual alarm band).

Figure 3:
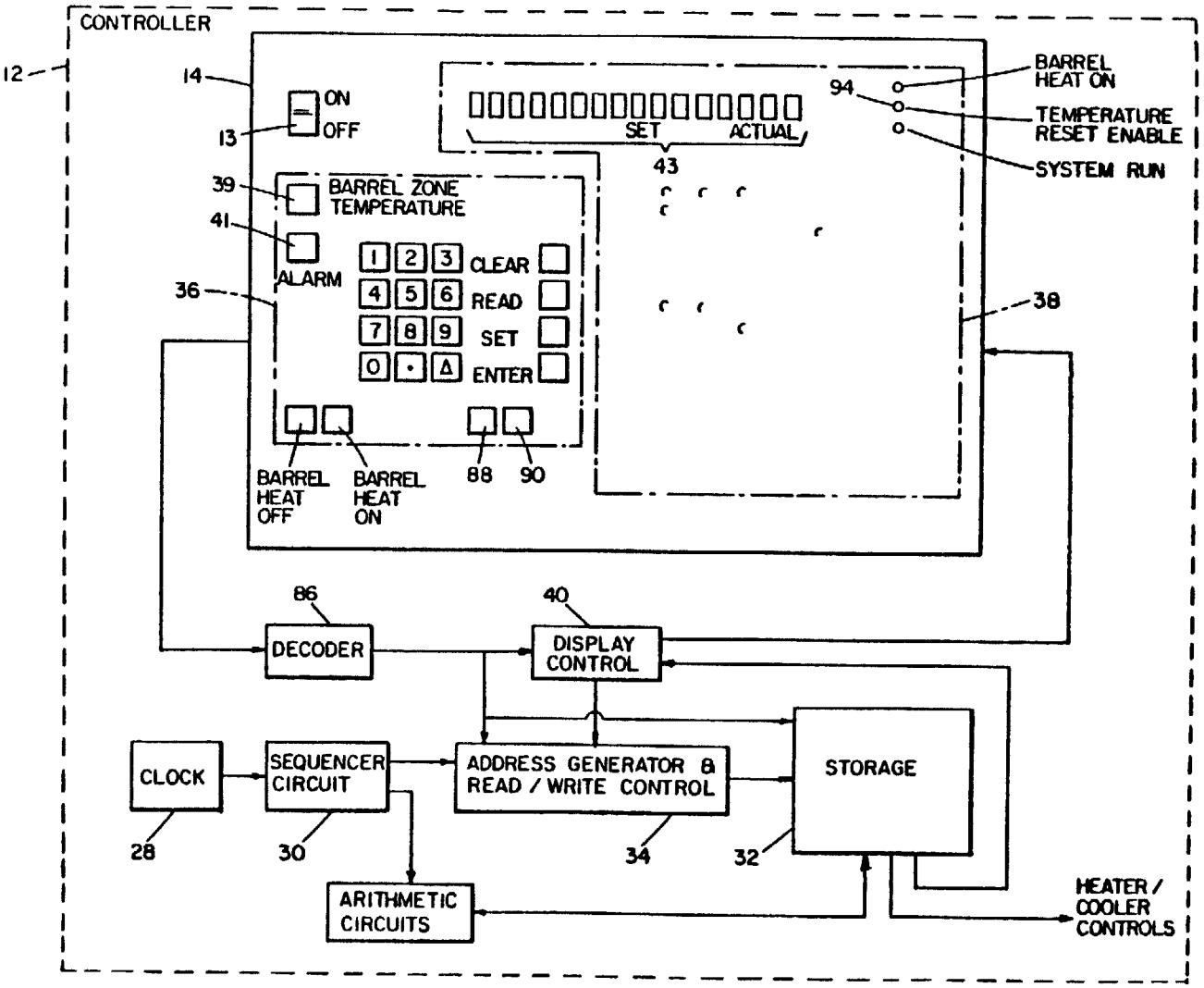
FIG. 3 shows schematically the controller, the control panel, and the outputs to the heater and cooler controls.

Referring now to FIG. 3, the controller 12 of the invention is shown diagrammatically (with details omitted for simplicity in this Figure) as including the panel 14, having an on/off switch 13, together with control circuitry to be described in more detail in what follows, but generally comprising a keyboard input decoder 86, display control 40, a clock 28, a sequencer circuit 30, an address generator and read/write control circuit 34, signal storage means 32, and various arithmetic circuits (such as adders, comparators, dividers, and multipliers), all of generally known design.

In brief summary, the readings of the thermocouple pairs in the barrel zones are input to the control circuitry, together with input control signals generated by the keys of keyboard 36 on panel 14. According to the invention, the input control signals (which are principally temperature set points and alarm set points, to be described) and the separately input thermocouple signals are employed, together with certain signals that are hardwired into the control circuitry, to generate appropriate output control signals, which are output to the power control device that operates the heater elements and to the pumps and solenoid valves that operate the cooling elements, to control the temperature of the extruder barrel. In the case of an air-cooled system, the blowers are controlled by the control signals. In addition, display control circuit 40 controls the display 38 of panel 14 to display information regarding the state of the system, as will be explained.

Referring still to FIG. 3, panel 14 comprises keyboard 36 and display 38. Keyboard 36 is based on an $8\times8$ switch array; however, not all the available switches are used in the controller. The switches relevant to the present invention are actuated by the following keys.

A $4\times3$ pad of key inputs the digits from 0 to 9. Four control keys to the right of the digit pad are labeled "clear", "read", "set", and "enter". "Clear" will clear an entry. "Read" controls the display of selected information. "Set" is used to change the barrel zone setpoints and alarm setpoints, which will be described. "Enter" is used, after a group of several digits has been keyed in and found to be correct by inspection of the display, to enter the digits.

To the left of the digit pad is a "Barrel zone temperature" key 39. Followed by actuation of a digit key to select the zone, and of the "Read" key, actuation of key 39 results in the display of the setpoint and actual temperature of the selected zone in the sixteen digit display 43. Followed by actuation of a digit key and the "Set" key, actuation of key 39 permits the actual setpoint of a barrel zone to be changed by the operator. A signal representative of the input temperature set point is stored in Actual Setpoint Stack 52 in Storage 32, to be described in connection with FIG. 4, at a location corresponding to the barrel zone. The "Alarm" key 41, located below key 39, is used in conjunction with the digit, "Read" and "Set" keys to read or to set the values of the actual alarm band, whose use will be described.

Below the digit pad is a row of four control keys. These are, left to right, "Barrel heat off", "Barrel heat on", and "Temperature reset disable" 90 and "Temperature reset enable" 88. The barrel heat might be disabled, for example, while heating the die at startup, or for other reasons. The use of keys 88 and 89 in connection with the reset operation will be described in what follows.

The signals input by actuation of the keys on keyboard 36 are applied to decoder circuit 86, which in turn applies decoded control signals to display control 40 or to other parts of the controller, such as storage 32, as appropriate, as will be described.

The display 38 of panel 14 includes a sixteen-digit alphanumeric display 43 and an array of status lights.

The status lights display includes particular lights to indicate "Barrel heat on", "Temperature reset enable", and "System run", together with further lights (not indicated in detail in the drawing) to indicate that particular barrel zones and die zones are heating or cooling. In addition, lights are provided (not shown) to indicate that a thermocouple break has been detected.

Figure 4:
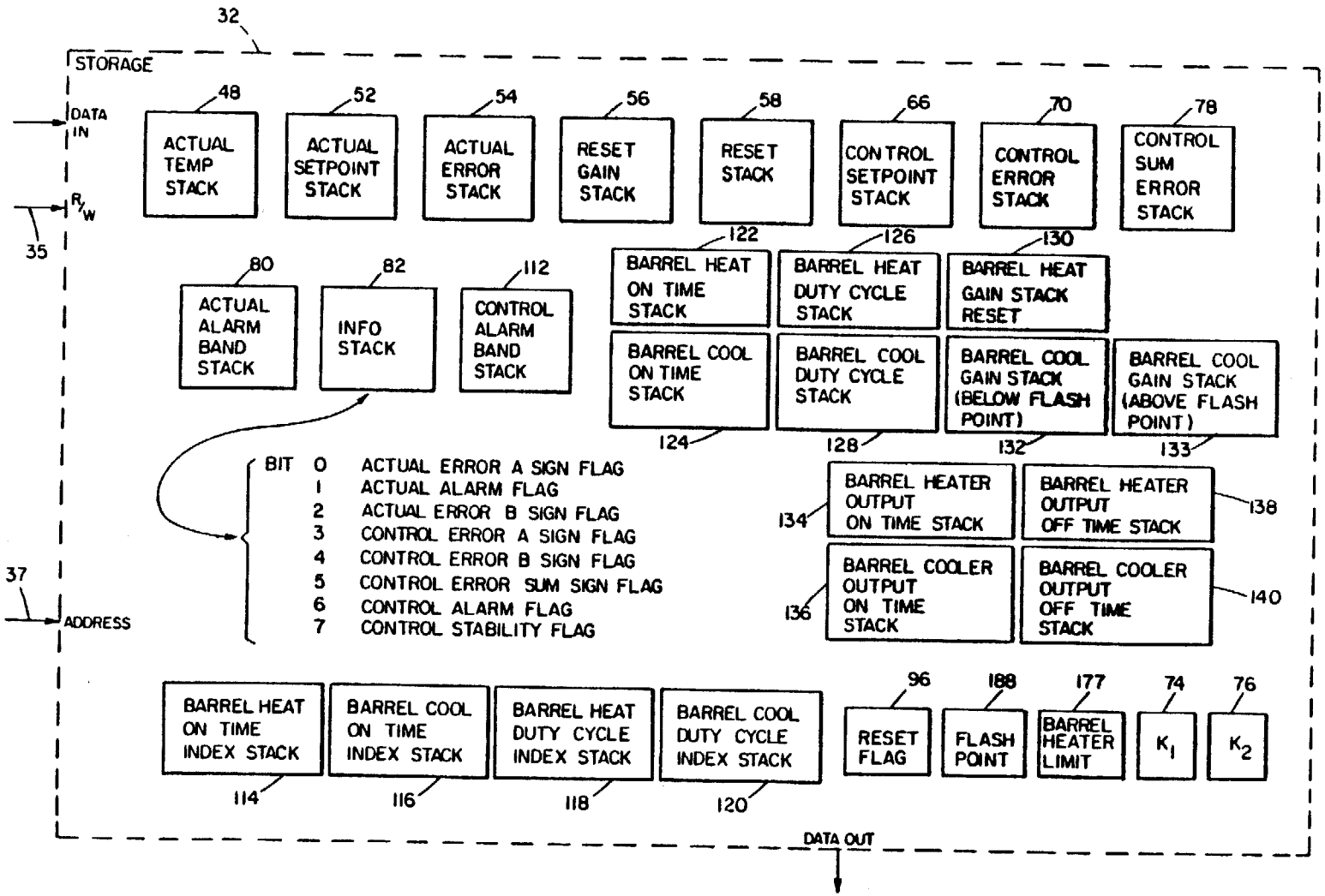
FIG. 4 shows the contents of the controller signal storage.

Referring now to FIG. 4, signal storage 32 comprises a plurality of conventional binary storage registers. Any other convenient signal storage may be employed. Storage 32 is regarded as divided into a number of particular portions that are set aside and referred to as individual stacks. The address generator and read/write control circuit 34, as controlled by sequencer circuit 30, generates a read/write control signal which is applied at 35 to storage 32 to cause signals representative of data to be applied to storage 32 at "DATA IN" or retrieved therefrom at "DATA OUT". The address generator and read/write control circuit 34, as controlled by sequencer circuit 30, also generates an appropriate set of address control signals which are applied to storage 32 at 37, and which select the particular stack and position therein that is addressed. In other Figures, the "DATA IN" and "DATA OUT" ports and signals 35 and 37 will be shown in connection with each individual stack.

Figure 6:
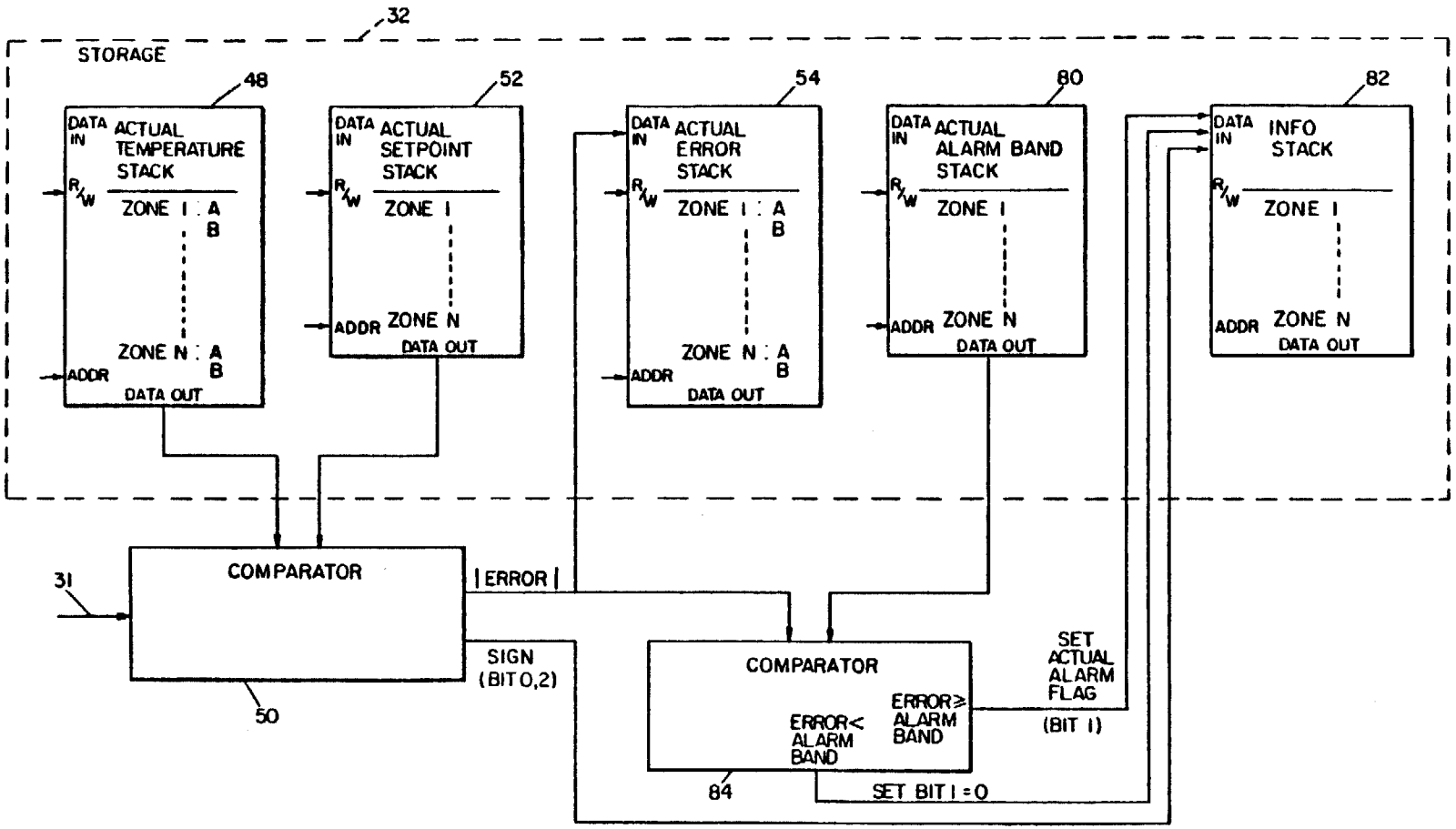
FIGS. 6, 7, 8, 9 and 10 show elements of the controller associated with generating certain internal control signals.
Figure 9:
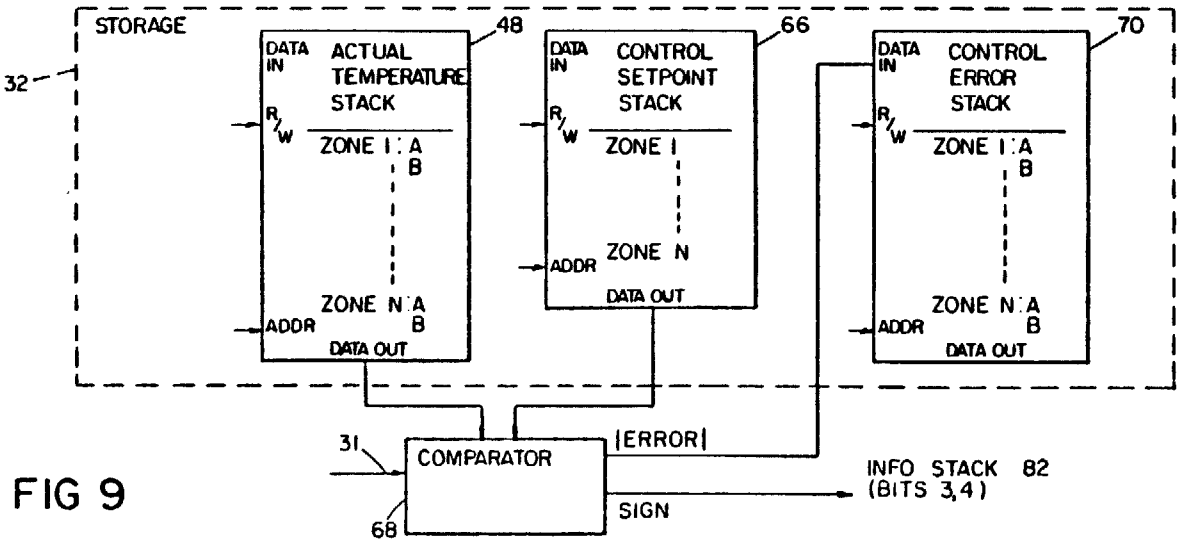
Figure 10:
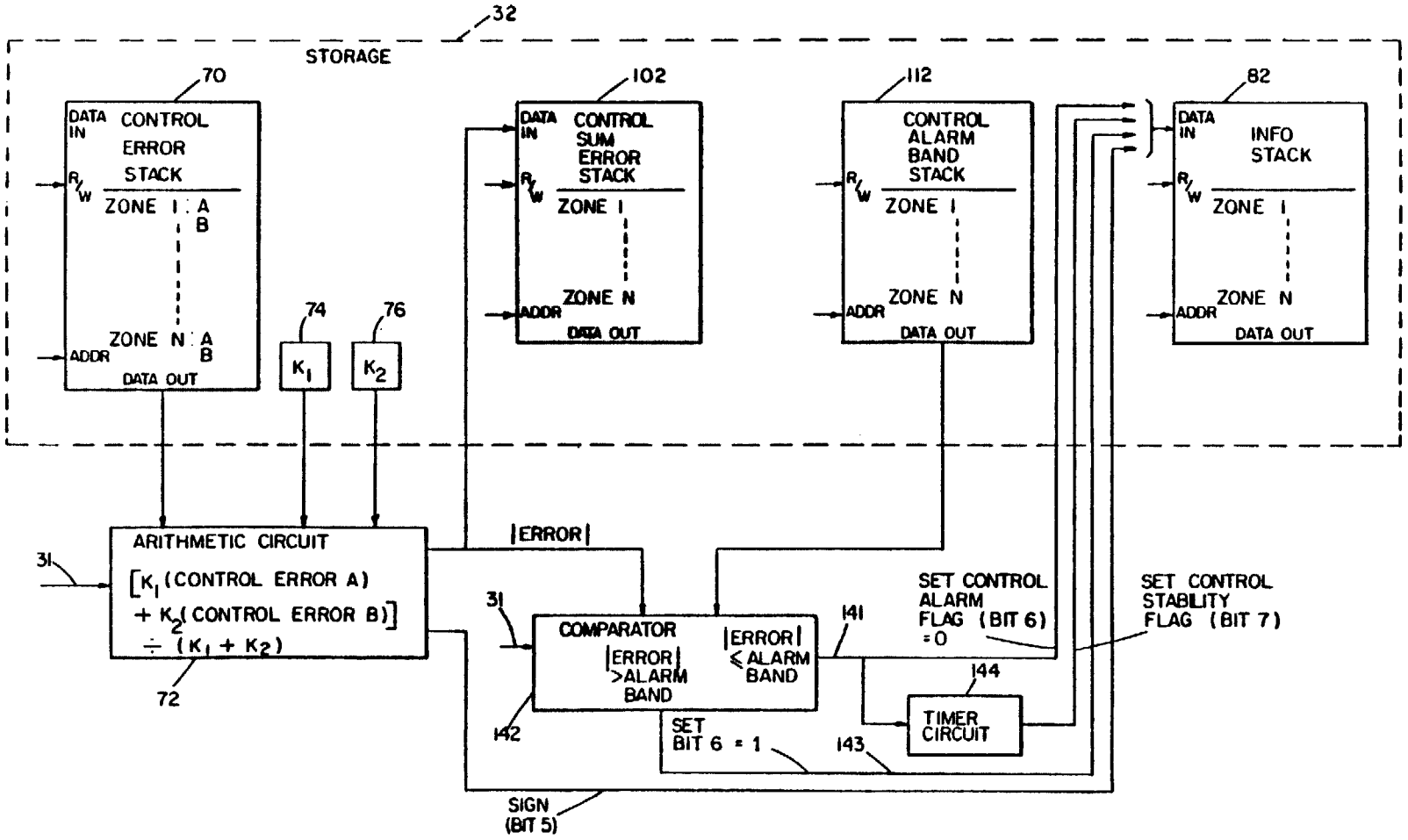

Storage 32 contains a first set of stacks that are employed to store input signals and signals that are employed in generating the control signals that are ultimately output to control the heater and cooler elements of the system. These are the Actual Temperature Stack 48, Actual Setpoint Stack 52, Actual Error Stack 54, Reset Gain Stack 56, Reset Stack 58, Control Setpoint Stack 66, Control Error Stack 70, Control Sum Error Stack 78, Actual Alarm Band Stack 80, Information Stack 82, and Control Alarm Band Stack 112. Information Stack 82 stores eight binary digits (bits) for each barrel zone. The significance of each of the eight bits will be explained in connection with the following figures: bits 0, 1 and 2: FIG. 6; bits 3 and 4: FIG. 9; bits 5, 6 and 7: FIG. 10.

Storage 32 further contains a set of four stacks which contain signals representative of tables of values, accessed during the control process by means of an index signal which will be described. These are the Barrel Heat On-time Index Stack 114, the Barrel Cool On-Time Index Stack 116, the Barrel Heat Duty Cycle Index 118, and the Barrel Cool Duty Cycle Index Stack 120. Signals stored in these stacks are selected by means of the index signal, and are retrieved to be used in controlling the heat/cool operation of the extruder system.

Finally, Storage 32 contains five sets of stacks which store signals more directly related to the output of control signals to the heater/cooler driver circuits. One of each set of these stacks contains signals related to heating operation, and one (or more) contains signals related to cooling operation. The sets of stacks are the On-Time (122 and 124), Duty Cycle (126 and 128), Gain (130, 132 and 133), Output On-Time (134 and 136), and Output Off-Time (138 and 140) stacks. The difference between stacks 132 and 133 will be explained in connection with FIG. 15.

The manner in which signals to be stored in all these stacks are generated, and the connections between the stacks, will be described in what follows.

Storage 32 also provides a register 96 containing a Reset Flag, to be described in connection with FIG. 7. In addition, storage 32 provides registers containing signals representative of certain constant values, whose use will be explained. These are register 188, containing the flash point temperature, which will be discussed in connection with FIG. 15; register 177, containing the barrel heat limit, which will be discussed in connection with FIG. 14; and registers 74 and 76, containing weighting factors, which will be discussed in connection with FIG. 10.

Figure 5:
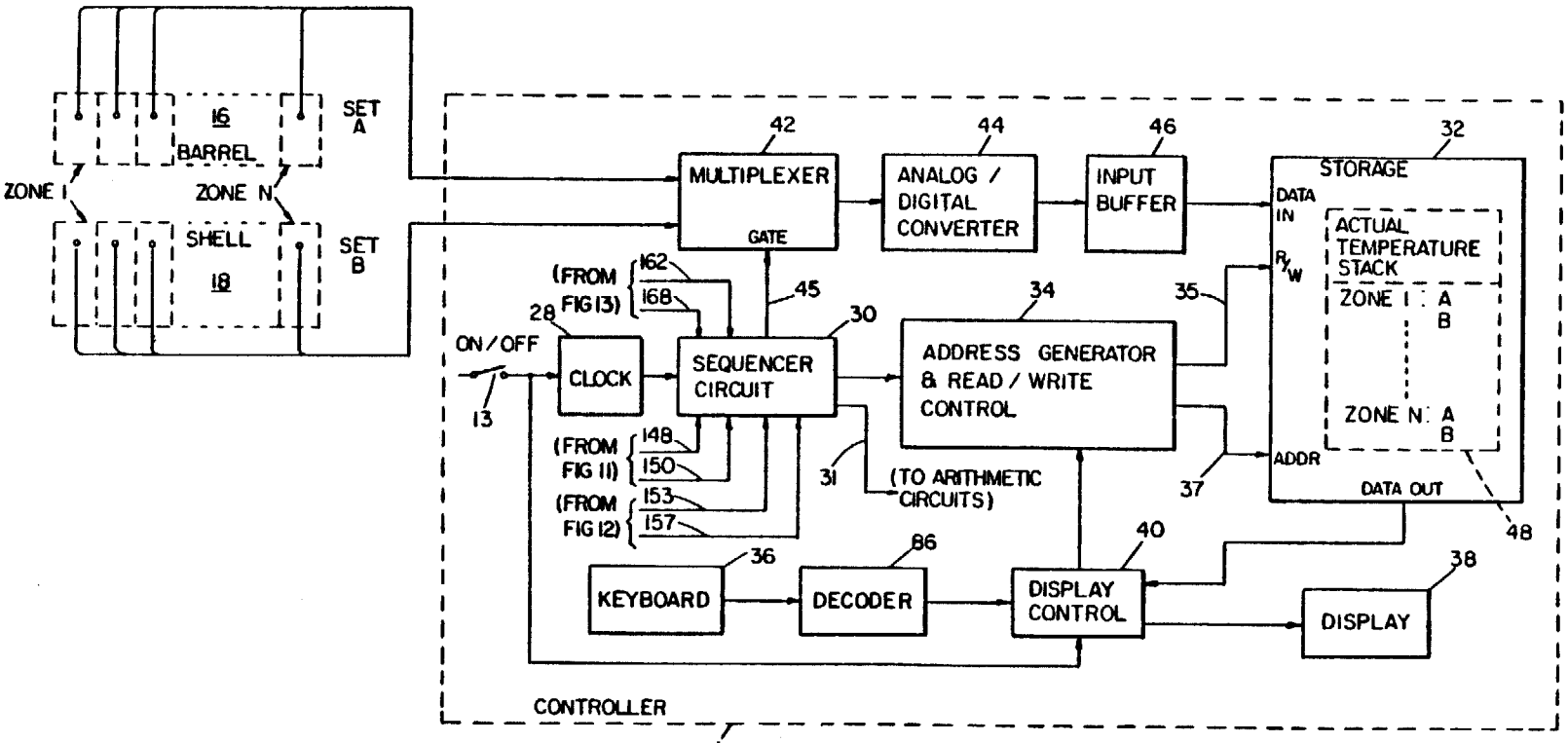
FIG. 5 shows the elements of the controller concerned with the reading and storing of the thermocouple signals.

Referring now to FIG. 5, the signals from the A and B thermocouple pairs in the extruder barrel 16 and shell 18 are input to a multiplexer 42. If there are eight barrel zones, there are sixteen independent input thermocouple signals, each on a separate channel. The sequencer circuit 30 controls the sequential scanning of the sixteen input channels (as well as other operations of the controller). A gating signal is generated by the sequencer circuit 30, and is applied on line [43] *45* to multiplexer 42 to select each input channel in turn. The selected input signal is applied to an analog/digital converter 44, where the analog thermocouple signal is converted to a digital signal, comprising a number of binary signals. The digital signal is applied to input buffer 46. The address generator and read/write control circuit 34, as controlled by sequencer circuit 30, generates a read/write control signal which is applied at 35 to storage 32 to cause the digital input signal to be input from buffer 46 into storage 32. The address generator and read/write control circuit 34, as controlled by sequencer circuit 30, also generates an appropriate set of address control signals, which are applied at 37 to storage 32. Under the control of the read/write signal at 35 and the address signals at 37, a signal representative of the input thermocouple reading, in digital form, is applied to Actual Temperature Stack 48. As is seen in FIG. 5, the contents of Stack 48 are in order by barrel zone from 1 to N, and each reading from each A or B thermocouple is separately stored, making 2N signals altogether.

As is also shown in FIG. 5, the display control circuit 40 receives input control signals from the keyboard 36 of panel 14 (through decoder 86), such as "READ BARREL ZONE 1" (whose input has been described). In response, display control circuit 40 causes the signal representative of the reading from the A thermocouple in barrel zone 1, in digital form, to be retrieved from the Actual Temperature Stack 48, and a numerical representation thereof to be displayed in digital form in the alphanumeric display 43 of display 38, together with the actual setpoint temperature for zone 1, which is represented by a signal stored in Actual Setpoint Stack 52, to be described (FIG. 6). (The signal from the B thermocouple is not displayed, because although it is essential to the operation of the controller of the invention, it is not of direct interest to the operator of the system.) Certain status information about the system (such as "barrel heat on", "system running") represented by signals stored in storage 32, is displayed on display 38 whenever the system is on, without specific request from the keyboard, as is shown by the direct connection from on/off switch 13 to display control 40.

Control signals 162 and 168 (from FIG. 13), 148 and 150 (from FIG. 11), and 153 and 157 (from FIG. 12) are applied to sequencer circuit 30 in response to certain physical conditions, as will be explained in connection with those figures; these signals affect the sequencing of the controller.

The read/write control signal 35 and address control signals 37 generated by the address generator and read/write control 34, the sequence control signal 31 from sequencer circuit 30, and control signals from the display control 40 control the storage, retrieval, modification and display of signals in the parts of the controller still to be described, in a manner similar to that described in connection with FIG. 5. For simplicity, circuits 30 and 34 will be omitted in FIGS. 6–15 although the control signals generated by them will be shown.

Referring now to FIG. 6, a further portion of storage 32, called the Actual Setpoint Stack 52, stores a set of signals representative of the setpoint temperature for each zone of the extruder barrel (N signals). The contents of this portion of storage may be altered by the operator of the system by the use of the Barrel Zone Temperature, digit, and Set keys, as has been described. In addition, a further portion of storage 32 is called the Actual Error Stack 54, and has the capacity to store signals representative of the difference between the actual setpoint and the actual temperature, corresponding to each thermocouple A and B in each of the N barrel zones, or 2N signals altogether.

When the first pair of thermocouples has been scanned and their corresponding two signals have been stored in stack 48 at the location corresponding to the first barrel zone, sequencer 30 controls the address generator and read/write control 34 to generate appropriate signals 35 and 37 to retrieve from stack 48 the actual temperature signal from barrel zone 1, thermocouple A, and to retrieve from stack 52 the signal representative of the actual setpoint for barrel zone 1. These signals are applied to comparator 50. Under the control of sequencing signal 31 from sequencer circuit 30, the comparator derives a signal representative of the absolute value of the difference (error) between the two input signals, and stores the derived signal into the Actual Error Stack 54 under the control of read/write and address signals from control circuit 34. At the same time, a signal representative of the sign of the difference is stored in the Information Stack, in the portion assigned to barrel zone 1; the sign is stored (by setting bit 0=0 or 1) in the lowest order bit (bit 0) of this portion, as seen in FIG. 4.

Referring to FIGS. 18b and 19, the "actual error" signal represents the vertical distance between the line of the actual set point and the temperature curve of thermocouple A, at a particular time.

The signal representative of the absolute value of the difference between the actual temperature and the actual setpoint is applied to comparator 84, together with a signal representative of the value of the "actual alarm band" for that barrel zone from Stack 80. The "actual alarm band" is an arbitrarily selected reference value, typically ±five degrees, used to determine what magnitude of error A is significant enough to warrant taking reset control action (FIG. 17a). The actual alarm band signals are initialized when power is turned on to a value chosen when the system is designed. However, the actual alarm band signals can be reset through the keyboard, as has been described.

The reset correction will not be computed if the actual error A is within the actual alarm band, that is, less than five degrees in absolute value (in the present embodiment). If the actual error A is greater than or equal to five degrees in absolute value, the "actual alarm flag" is set in Information Stack 82, in the portion assigned to barrel zone 1; the flag is represented by bit 1 of this portion, as seen in FIG. 4. If the actual error is less than five degrees in absolute value, the "actual alarm flag" is not set (bit 1=0). Using this flag, a decision will be made at a later time in the control process to employ or not employ the reset adjustment, as will be explained in connection with FIG. 7.

The signals representative of the reading from the first barrel zone, thermocouple B, and the actual setpoint for the first barrel zone are also compared to derive the actual error B signal, which is stored in Actual Error Stack 54. The sign of the error is represented by bit 2 of the location in the Information Stack 82 corresponding to the first barrel zone.

Figure 7:
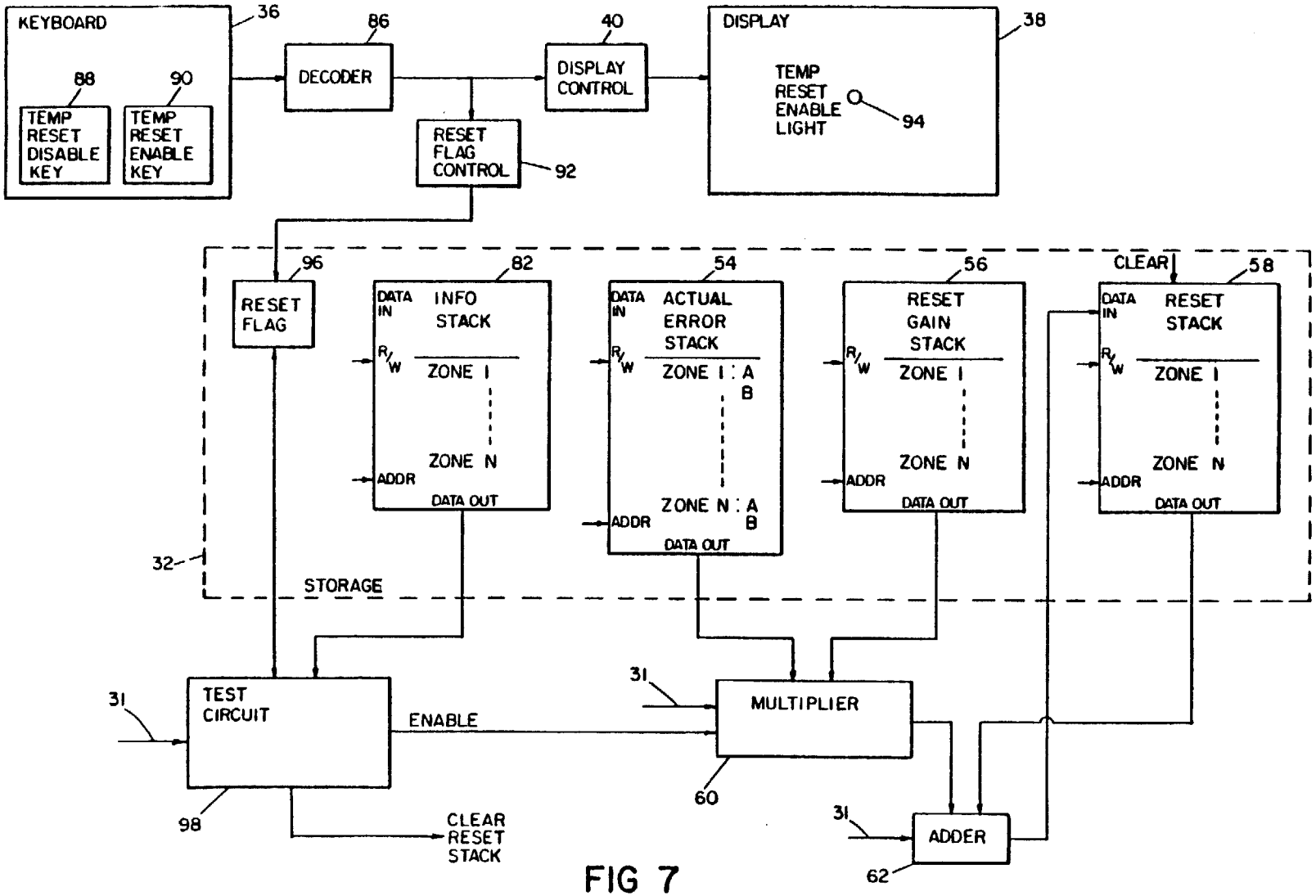

FIG. 7 shows the elements of the controller associated with the derivation of the Reset correction signals which are employed in the control of the heater/cooler elements to adjust the temperature of the extruder barrel. A portion of storage 32 is set aside and called the Reset Gain Stack 56. This stack stores a signal representative of the value of reset gain for each barrel zone, making N signals altogether. These signals are, in most cases, hardwired into the storage when the extruder system and its controller are designed; however, provision may be made for altering the reset gain values. A further portion of storage 32 is set aside and called the Reset Stack 58, which stores a signal representative of the reset for each barrel zone, or N signals altogether.

Keyboard 36 on panel 14 provides two keys related to the Reset feature, the Temperature Reset Disable key 88 and Temperature Reset Enable key 90. Actuation of either of these keys closes one of two switches in the 8×8 switch matrix which input appropriate control signals to decoder 86. The decoded signal from either of keys 88 and 90 is applied to Reset Flag Control 92 and to Display Control 40. Display Control 40 conditions the Temperature Reset Enable light 94 on Display 38 in accordance with the decoded signal. Reset Flag Control 92 applies a signal to condition the Reset Flag in Register 96 (in Storage 32). When Temperature Reset Disable key 88 is actuated, the Reset Flag is set to 0 and light 94 is turned off. When Temperature Reset Enable key 90 is actuated, the Reset Flag is set to 1 and light 94 is turned on.

When the actual errors A and B for the first barrel zone have been stored in Actual Error Stack 54 (as described in connection with FIG. 6), sequencer 30 generates a control signal 31 which enables Test Circuit 98. This circuit tests the state of Reset Flag 96 and portions of the contents of Information Stack 82 for each barrel zone, and conditions other portions of controller 12 in accordance with the results of the tests, as will be described.

If the Reset Flag is not set (because the Temperature Reset Disable key 88 has been actuated) Test Circuit 98 generates a "clear reset stack" signal, which is applied to Reset Stack 58 to clear the entire contents. As a result, in the control process, when the signals representative of the reset value are applied to affect the control of the heater/cooler elements, the signals retrieved from the Reset Stack 58 are all zero and do not affect the control process. In this case, the multiplier and adder circuits 60 and 62 are not enabled.

If the Reset Flag is found to be set (because the Temperature Reset Enable key 90 has been actuated), Test Circuit 98 next tests certain bits in the Information Stack 82 for the first barrel zone. Some of these bits have been set during previous operating cycles of controller 12; the sequencing of controller 12 is such that these bits will be updated in response to current temperature measurements after the reset signal has been derived.

Test Circuit 98 first tests bit 1 of the signal stored in Information Stack 82 in the location corresponding to the first barrel zone. Referring to FIG. 4, it is seen that this bit represents the Actual Alarm Flag for the first barrel zone. The manner in which this bit was set was described in connection with FIG. 6. Unless this bit is 1 (flag set), indicating that the actual error A is greater than the actual alarm band, the arithmetic circuits 60 and 62 cannot be enabled. If this bit is 1, bit 6 (the Control Flag) of the signal stored at the location corresponding to the first barrel zone is tested. The manner in which this bit is set will be described in connection with FIG. 10. Unless this bit is 0 (Control Flag not set), indicating that the control sum error is within the control alarm band, the arithmetic circuits 60 and 62 cannot be enabled. This test is required because the Reset feature is useful only when the control error is within certain limits, as will be explained in connection with FIG. 10. Finally bit 7 (Control Sum Stability Flag) for the first barrel zone is tested. The manner in which this bit is set will be described in connection with FIG. 10. Unless this bit is 1, indicating that the control sum error is stable within the control alarm band, arithmetic circuits 60 and 62 cannot be enabled to permit derivation of a new reset signal for the first barrel zone. This test is required because the Reset feature is useful only when the zone is operating in stable conditions.

If the tested bits have the appropriate condition (1 or 0), test circuit 98 generates an "enable" signal which is applied to multiplier circuit 60. (This occurs at the time indicated by the word "RESET" in FIGS. 18b and 19.) Sequencer 30 controls address generator and read/write control 34 to generate appropriate control signals to retrieve from Actual Error Stack 54 the signal representative of the actual error that was derived by comparator 50 for the first barrel zone, thermocouple A.

At the same time, control circuit 34 controls the retrieval from Reset Gain Stack 56 of the signal representative of the reset gain value for the first barrel zone. (The reset gain value for each barrel zone modifies the on-time of the duty cycle according to the load in that zone, which is a function of the system configuration; the gain is empirically determined at the time the system and the controller are constructed. These values are hardwired into the controller and cannot be altered by the system operator.) The signals from stacks 54 and 56 are applied together to multiplier circuit 60, which, as controlled by the signal 31 from sequencer 30, derives a signal representative of the product of the actual error and the reset gain for the first barrel zone, and applies it to adder 62. Control circuit 34 controls the retrieval from Reset Stack 58 of the signal representative of the old reset value (which may be 0) for the first barrel zone. This signal is applied to adder 62. As controlled by signal 31 from sequencer 30, the two signals applied to adder 62 are combined and a signal is derived representative of the sum of the two, which is applied to Reset Stack 58, replacing the signal representing the old reset value.

Figure 8:
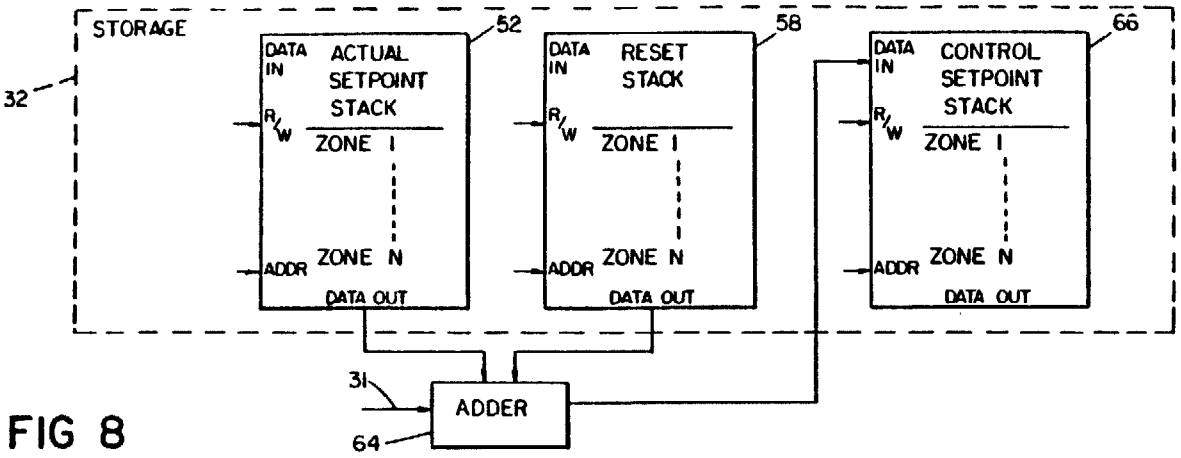

Referring now to FIG. 8, a portion of storage 32 is set apart and called the Control Setpoint Stack 66. When the value of the reset for the first barrel zone, stored in Reset Stack 58, has been retrieved and modified, or not modified if the arithmetic circuits 60 and 62 are not enabled by test circuit 98, sequencer circuit 30 generates a sequencing signal 31, which is applied to adder 64. At the same time, read/write control and address generator 34, as controlled by sequencer circuit 30, generates appropriate control signals which are applied to Actual Setpoint Stack [56] *52* and to Reset Stack 58 to control the retrieval of the signals stored therein in positions corresponding to the first barrel zone. These signals are applied together to adder 64. A signal representative of the sum of the two signals is derived and is applied to Control Setpoint Stack 66. Under the control of read/write and address signals from circuit 34, the derived signal is stored in Stack 66 in the position corresponding to the first barrel zone. This signal is always positive.

If the Reset is disabled, the Control Setpoint for each barrel zone will be equal to the Actual Setpoint.

Referring now to FIG. 9, a further portion of storage 32 is set apart and called the Control Error Stack 70.

The control error is the difference between the actual temperature and the control setpoint. When the control setpoint for the first barrel zone has been derived and stored in Stack 66, sequencer 30 controls address generator and read/write control 34 to generate appropriate signals to retrieve from Actual Temperature Stack 48 the signal representative of the reading of thermocouple A, for the first barrel zone, and to apply this signal to comparator 68. At the same time, the signal stored in Control Setpoint Stack 66 corresponding to the first barrel zone is retrieved and applied to comparator 68, which, under the control of sequencer 30, derives a signal representative of the absolute value of the sum of the input signals and applies the signal to Control Error Stack 70. A control error will be derived for each thermocouple reading, A and B, in each barrel zone; 2N control error signals are stored in stack 70. A signal representative of the sign of the control error is applied to the Information Stack 82 at the location corresponding to the first barrel zone. The sign of the control error for the thermocouple is represented by bit 3; the sign of the control error for the B thermocouple is represented by bit 4.

Referring now to FIG. 10, Control Sum Error stack 102 is capable of storing a signal corresponding to each barrel zone, or N signals in all. When the signals representative of the control errors A and B for the first barrel zone have been stored in the Control Error Stack 70, as described in connection with FIG. 9, sequencer 80 controls the retrieval of the control error signal from stack 70 and its application to arithmetic circuit 72, which is composed of appropriate multiplier, adder and divider circuits to derive a signal representative of the ratio shown in box 72 (FIG. 10). Signals representative of the constants K1 and K2 are applied to circuit 72 from storage registers 74 and 76. These values are hardwired and are not normally adjustable.

A signal representative of the absolute value of the ratio (error) shown in circuit 72 is derived from the first barrel zone, and is applied to Control Sum Error Stack 78 under the control of address generator and read/write control 34. A signal representative of the sign of the ratio is applied to Information Stack 82 to set bit 5 ("Control Sum Error Sign Flag") of the signal in the location corresponding to the first barrel zone. The control sum error is compared with the control alarm band, proportional band (heating or cooling), and heating or cooling dead band widths, as shown in FIG. 17b.

The signal representative of the absolute value of the control sum error is applied to comparator 142 (FIG. 10), together with a signal retrieved from Control Alarm Band Stack 112, representing the value of the control alarm band for the first barrel zone, typically ±two degrees (FIG. 17b). If the control sum error is greater than two degrees in absolute value, comparator 142 generates a signal 143 that is applied to the Information Stack 82 to set=1 bit 6 ("Control Alarm Flag") of the signal stored in the location corresponding to the first barrel zone. This value of bit 6 is employed to prevent derivation of the Reset signal while the control sum error is relatively large. If the control sum error is less than or equal to two degrees, comparator 142 generates a signal 141 that is applied to Information Stack 82 to set bit 6 =0, indicating that the control error has become small enough to make the Reset signal of use. Signal 141 from comparator 142 also starts a timer circuit 144. (The time when this occurs is indicated on FIGS. 18b and 19 by the words "CONTROL ALARM FLAG SET TO 0".) A particular time period, typically two minutes, is selected as defining stable conditions. When this time period has elapsed since the control sum error has first been within the control alarm band, timer 144 generates a signal that is applied to the Information Stack 82 to set bit 7 ("Control Stability Flag") of the signal stored in the location corresponding to the first barrel zone.

Figure 11:
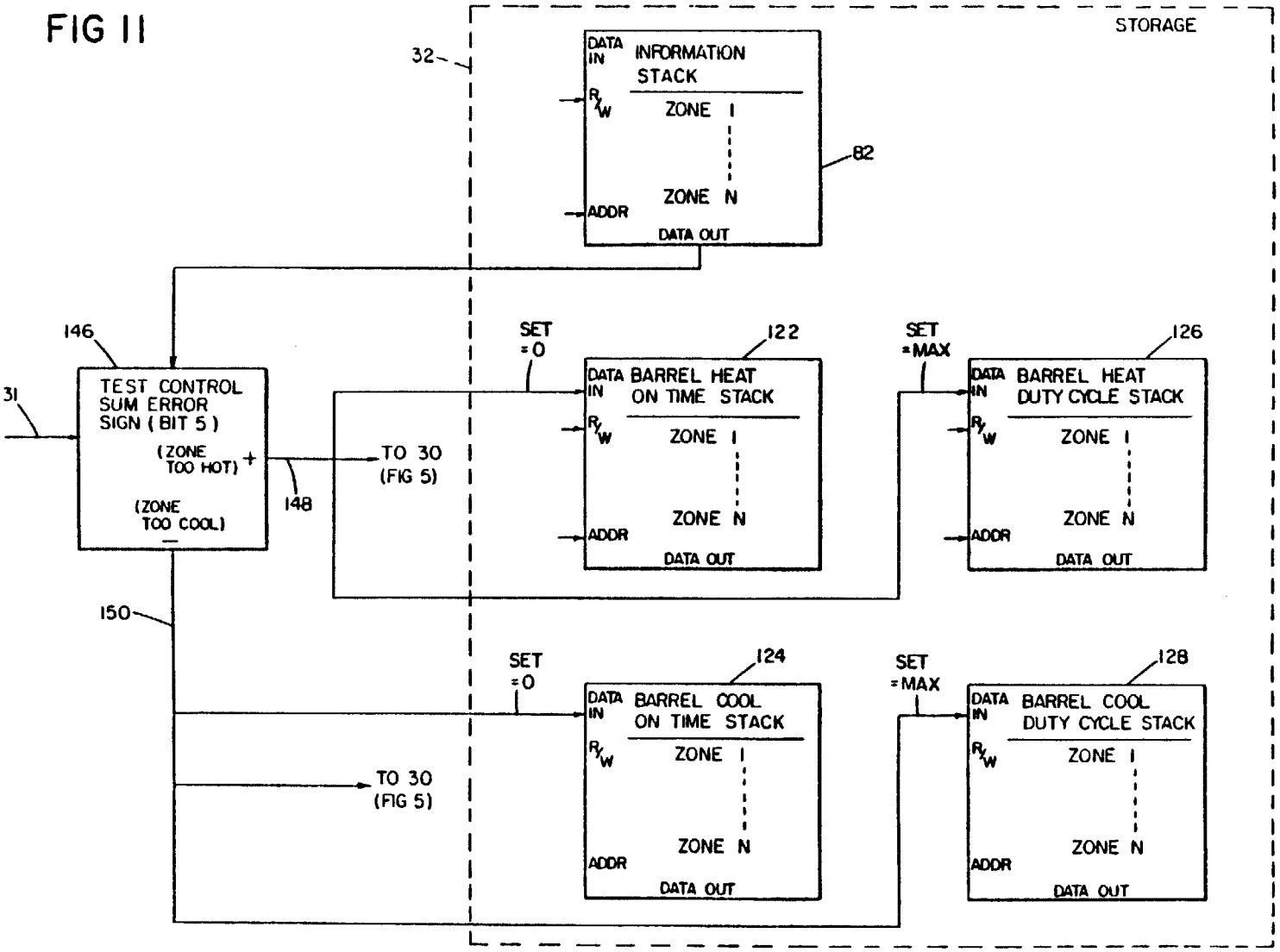
FIGS. 11, 12, 13, 14 and 15 show elements of the controller more particularly associated with generating control signals to be output to the heater and cooler controls.

Referring now to FIG. 11, when the control sum error signal for the first barrel zone has been stored in Control Sum Error Stack 102 (FIG. 10), sequencer circuit 30 controls test circuit 146 to test the state of bit 5 ("Control Sum Error Sign") of the signal stored in the location corresponding to the first barrel zone in Information Stack 82. If the sign is found to be positive (bit 5 =1), indicating that it is necessary to cool the extruder barrel zone, test circuit 146 generates a control signal 148 which is applied to the Barrel Heat On Time Stack 122 to set to zero the signal representing the heater on-time for the first barrel zone. At the same time, the control signal 148 from test circuit 146 is applied to Barrel Heat Duty Cycle Stack 126 to set to its maximum value the signal representative of the heat duty cycle for that barrel zone. (The maximum value is generally hardwired into the system.) Finally, the control signal 148 from test circuit 146 is applied to sequencer circuit 30 (FIG. 5), to control it to generate appropriate sequencing signals to control the operation of the controller elements described in connection with FIG. 12.

If test circuit 146 finds the sign to be negative (bit 5=0), indicating that it is necessary to heat the extruder barrel zone, test circuit 146 generates a control signal 150 which is applied to the Barrel Cool On-Time Stack 124 to set to zero the signal representative of the cooler on-time for that barrel zone. At the same time, control signal 150 from test circuit 146 is applied to Barrel Cool Duty Cycle Stack 128 to set to its maximum value the signal representative of the duty cycle for that barrel zone. Finally, control signal 150 is applied to sequencer circuit 30 (FIG. 5) to control it to generate appropriate sequencing signals to control the operation of the controller elements described in connection with FIG. 13.

Figure 12:
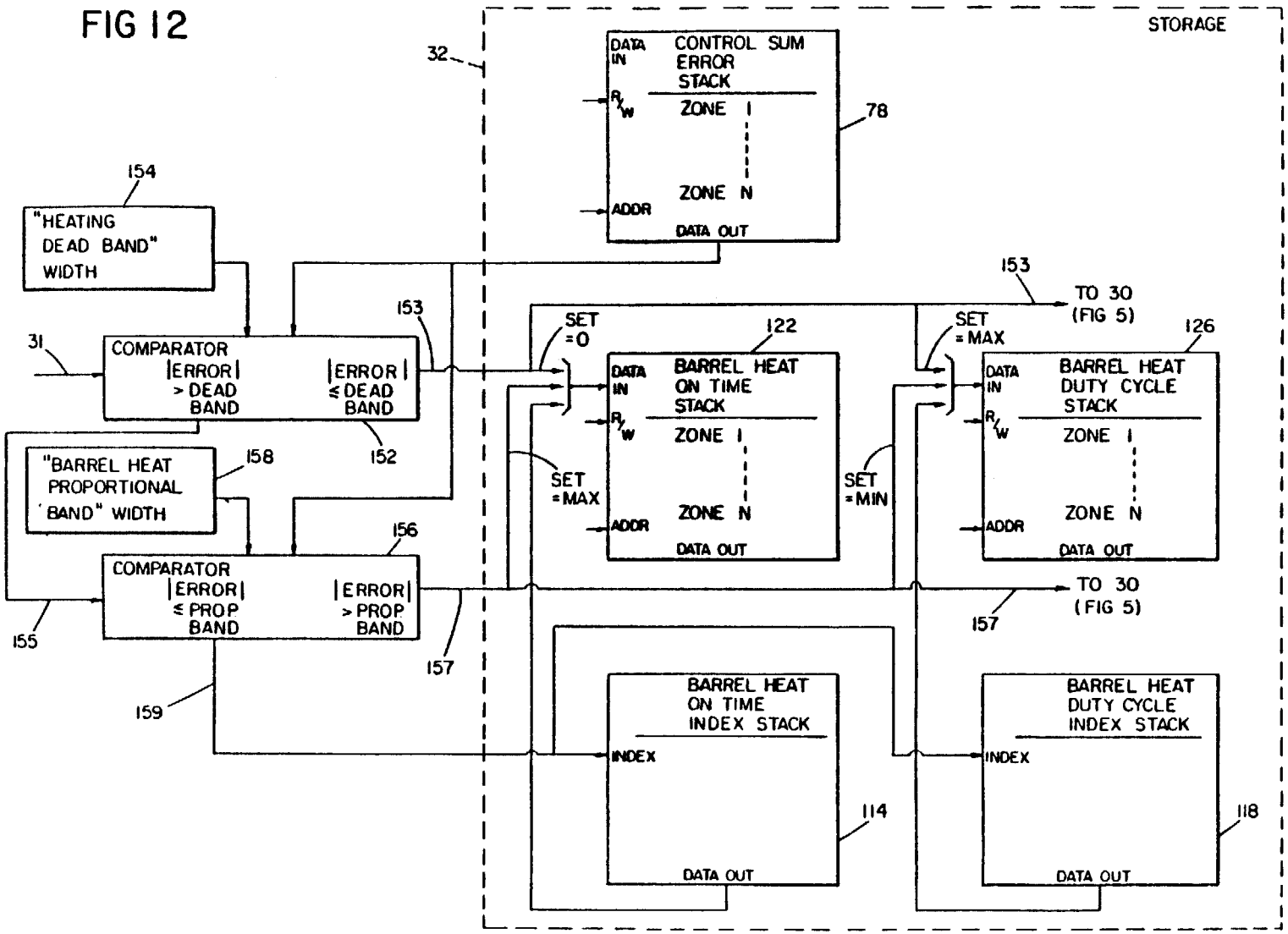

Referring now to FIG. 12, which shows portions of controller 12 associated with control action to heat the barrel zone, the sequencing signal 31, generated by circuit 30 (FIG. 5) in response to control signal 150 from test circuit 146, enables a comparator 152. A signal representative of the absolute value of the control sum error for the first barrel zone is retrieved from stack 78 under the control of read/write and address signals from circuit 34, as controlled by sequencer circuit 30. This signal is applied to comparator 152 together with a signal representing the "heating dead band width", or the value of the temperature range very slightly below the no error condition (typically 1 degree; see FIG. 17b). This value is generally hardwired into the system. The signal representative of the heating dead band width is stored in a register 154.

If the control sum error is within this heating dead band no heat will be input to the system, even though the sign of the error indicates that the temperature of the barrel is slightly below the no-error condition. In this case, comparator 152 generates a signal 153, which is applied to Barrel Heat On Time Stack 122 to set to zero the signal representative of the heat on-time for the first barrel zone. Signal 153 is also applied to Barrel Heat Duty Cycle Stack 126 to set to the maximum value the signal representative of the duty cycle for the first barrel zone. At this point, neither the heater nor the cooler elements for the first barrel zone are powered. Signal 153 is applied to sequencer circuit 30 (FIG. 5) to cause circuit 30 to control the operation of the controller elements shown in FIGS. 14 and 15.

However, if the absolute value of the control sum error is greater than the heating dead band width (the sign being still negative), comparator 152 generates a control signal 155 which enables comparator 156. The signal representative of the absolute value of the control sum error for the first barrel zone is applied to comparator 156, together with a signal representative of the width of the "barrel heat proportional band", stored in register 158. (This value is hardwired into the system.)

The "barrel heat proportional band" is a temperature range below the no-error condition, typically from five to twenty-five degrees. In the system described herein the barrel heat proportional band is six degrees. If the error is greater than this value, no attempt will be made to proportion the heat on-time and heat duty cycle; rather, the maximum on-time and minimum duty cycle will be employed until the zone warms to the point at which the error is found to be within the barrel heat proportional band (left hand portion of FIG. 17b). If the error is less than or equal to this value, the heat on-time and heat duty cycle will be proportioned, as will be described.

If the absolute value of the control sum error for the barrel zone is greater than six degrees, comparator 156 generates a control signal 157 which is applied to Barrel Heat On Time Stack 122 to set to the maximum value the signal representative of the heat on-time for that barrel zone. Control signal 157 is also applied to Barrel Heat Duty Cycle stack 126 to set to the minimum value the signal representative of the heat duty cycle for the barrel zone. Finally, control signal 157 is applied to sequencer circuit 30 (FIG. 5) to cause it to control the operation of the controller elements shown in FIGS. 14 and 15.

If the absolute value of the control sum error for the barrel zone is less than or equal to six degrees, comparator 156 generates control signal 159, which is applied as an index signal to Barrel Heat On Time Index Stack 144 and to Barrel Heat Duty Cycle Index Stack 118. The index signal selects signals representative of the appropriate heat on-time and heat duty cycle values, and causes such signals to be applied to stacks 122 and 126 respectively, to be stored at the location in each stack corresponding to the first barrel zone. Control signal 159 is also applied to sequencer circuit 30 (FIG. 5).

Figure 13:
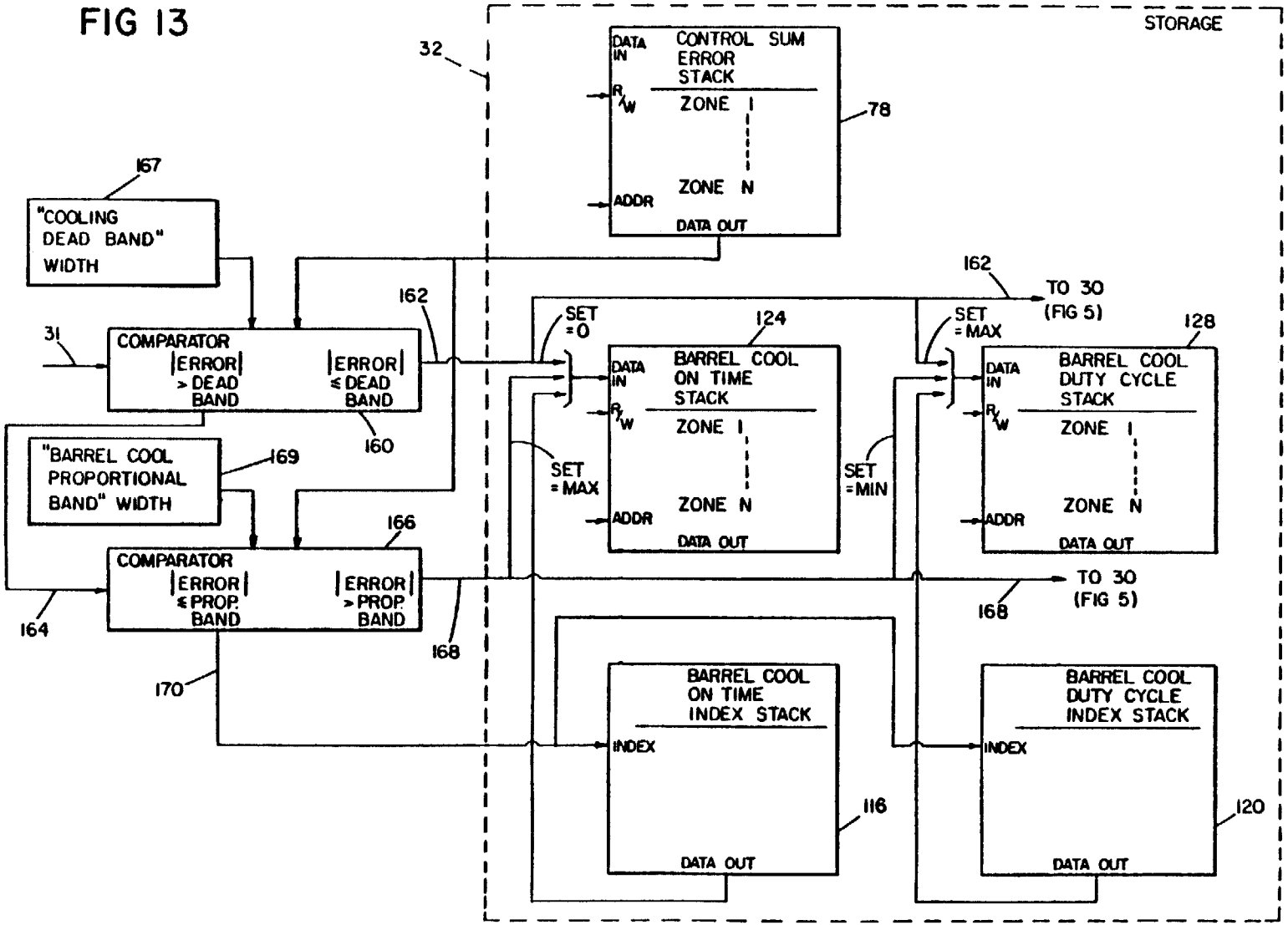

Referring now to FIG. 13, if test circuit 146 (FIG. 11) generates control signal 148 in response to the negative sign of the control sum error (indicating that the zone is too hot), sequencer circuit 30 (FIG. 5) responds to signal 148 by enabling comparator 160. A signal representative of the absolute value of the control sum error for the barrel zone is retrieved from stack 78 under the control of read/write and address signals from circuit 34, as controlled by sequencer circuit 30. This signal is applied to comparator 160 together with the signal representing the "cooling dead band width" from register 167 (one degree; see FIG. 17b). If the control sum error is within this "cooling dead band" the system will not be cooled; even though the sign of the error indicates that the temperature of the barrel is slightly above the no-error condition.

In this case, comparator 160 generates a control signal 162, which is applied to Barrel Cool On Time Stack 124 to set to zero the signal representative of the on-time for the first barrel zone. Signal 162 is also applied to Barrel Cool Duty Cycle Stack 128 to set to the maximum value the signal representative of the duty cycle for the first barrel zone. At this point, neither the heater nor the cooler elements are powered. Signal 162 is applied to sequencer circuit 30 (FIG. 5) to cause it to control the operation of the controller elements shown in FIGS. 14 and 15.

However, if the absolute value of the control sum error is greater than one degree, comparator 160 generates a control signal 164 which enables comparator 166. The signal representative of the absolute value of the control sum error for the barrel zone is applied to comparator 166, together with the signal representative of the width of the "barrel cool proportional band", stored in register 169. In the system described herein, this band is twenty degrees wide (FIG. 17b).

If the absolute value of the control sum error for the first barrel zone is greater than twenty degrees, comparator 166 generates a control signal 168 which is applied to Barrel Cool On Time Stack 124 to set to the maximum value the signal representative of the on-time for that barrel zone. Control signal 168 is applied to Barrel Cool Duty Cycle Stack 128 to set to the minimum value the signal representative of the duty cycle for the first barrel zone. Finally, control signal 168 is applied to sequencer circuit 30 (FIG. 5) to cause it to control the operation of the controller elements shown in FIGS. 14 and 15.

If the absolute value of the control sum error for the first barrel zone is less than or equal to twenty degrees, comparator 156 generates control signal 170, which is applied an an index signal to Barrel Cool On Time Index Stack 116 and to Barrel Cool Duty Cycle Index Stack 120. The index signal selects signals representative of the appropriate cooling on-time and cooling duty cycle values, and causes such signals to be applied to stacks 124 and 128 respectively, to be stored at the location corresponding to the first barrel zone.

Figure 14:
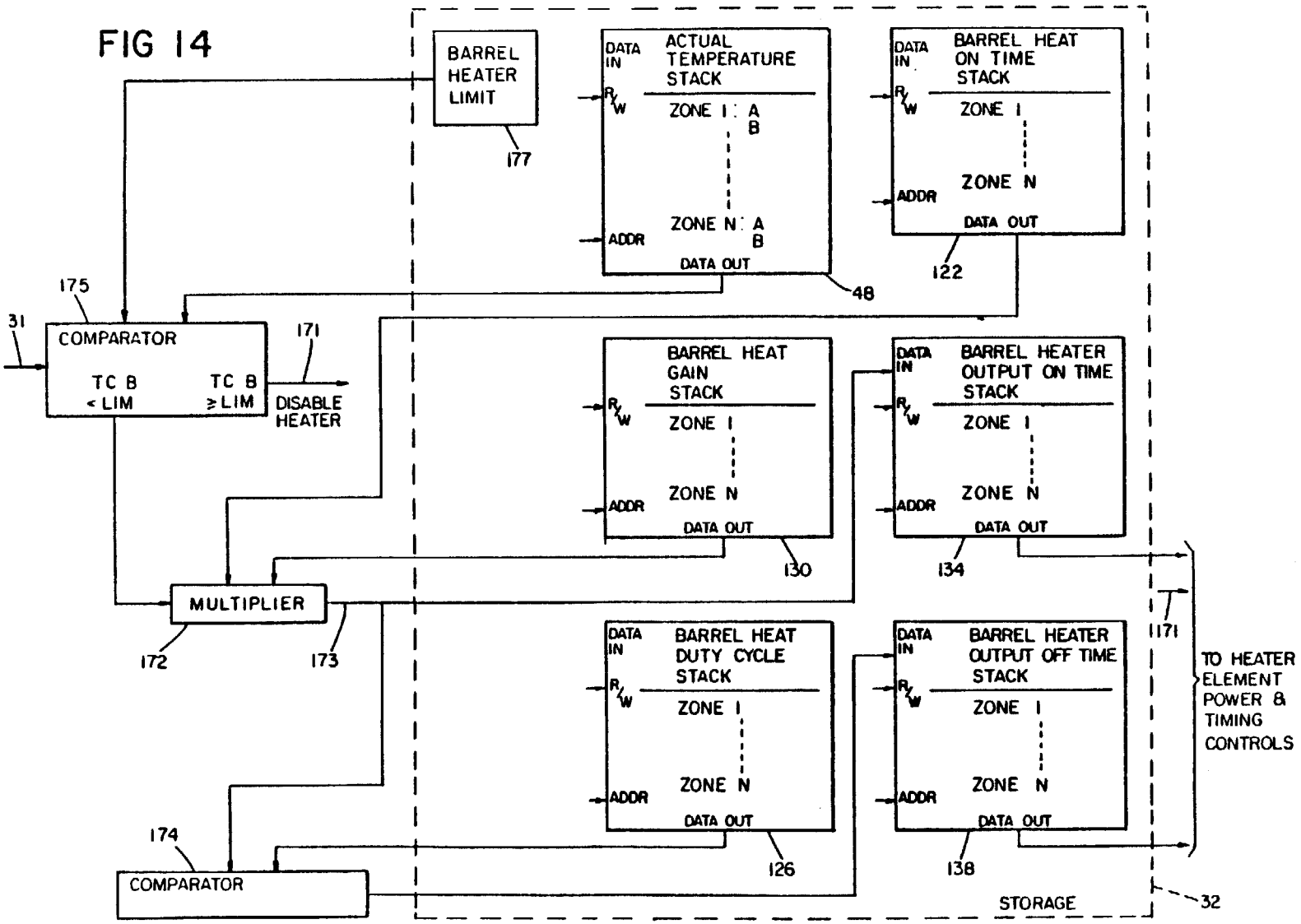

Referring now to FIG. 14, when the locations corresponding to the first barrel zone in stacks 122–128 have been filled, sequencer circuit 30 generates a sequencing signal 31 which enables comparator 175. The signal corresponding to the B thermocouple reading for the first barrel zone is retrieved from Actual Temperature Stack 48, under the control of appropriate read/write and address signals from circuit 34, and applied to comparator 175, together with the signal from register 177, representative of the constant value "barrel heater limit." This value is a physical parameter dependent on the design of the heater and of the system wiring, and is hardwired into the system, although provision may be made for adjustment.

If the B thermocouple reading, which represents the temperature inside the heater of that barrel zone, is greater than the barrel heater limit, comparator 175 outputs a control signal 171, which is applied to the heater element power control to disable the heater for that zone. This protects the heater from damage from overheating. If the B thermocouple reading is less than the barrel heater limit, comparator 175 generates a signal to enable multiplier circuit 172. Sequencer circuit 30 (FIG. 5) further controls circuit 34 to generate appropriate read/write and address signals to cause to be retrieved from Barrel Heat On-Time Stack 122 the signal representative of the heating on-time for the first barrel zone, and to cause to be retrieved from Barrel Heat Gain Stack 130 the signal representative of the barrel heat gain for the first barrel zone. The gain values are hardwired into the system.

These two retrieved signals are applied to multiplier 172, which derives a control signal 173 representative of the product of the two values, and applies it to Barrel Heater Output On-Time Stack 134. Under the control of appropriate read/write and address signals, the signal 173 is stored in the location corresponding to the first barrel zone. At the same time, signal 173 is applied to comparator 174, together with the signal representative of the barrel heat duty cycle value, stored in Barrel Heat Duty Cycle Stack 126 at the location corresponding to the first barrel zone. Comparator 174 derives a signal representative of the difference between the input signals, and applies it to Barrel Heater Ouput Off-Time Stack 138, where, under the control of appropriate read/write and address signals from circuit 34, the difference signal is stored in the location corresponding to the first barrel zone.

Figure 15:
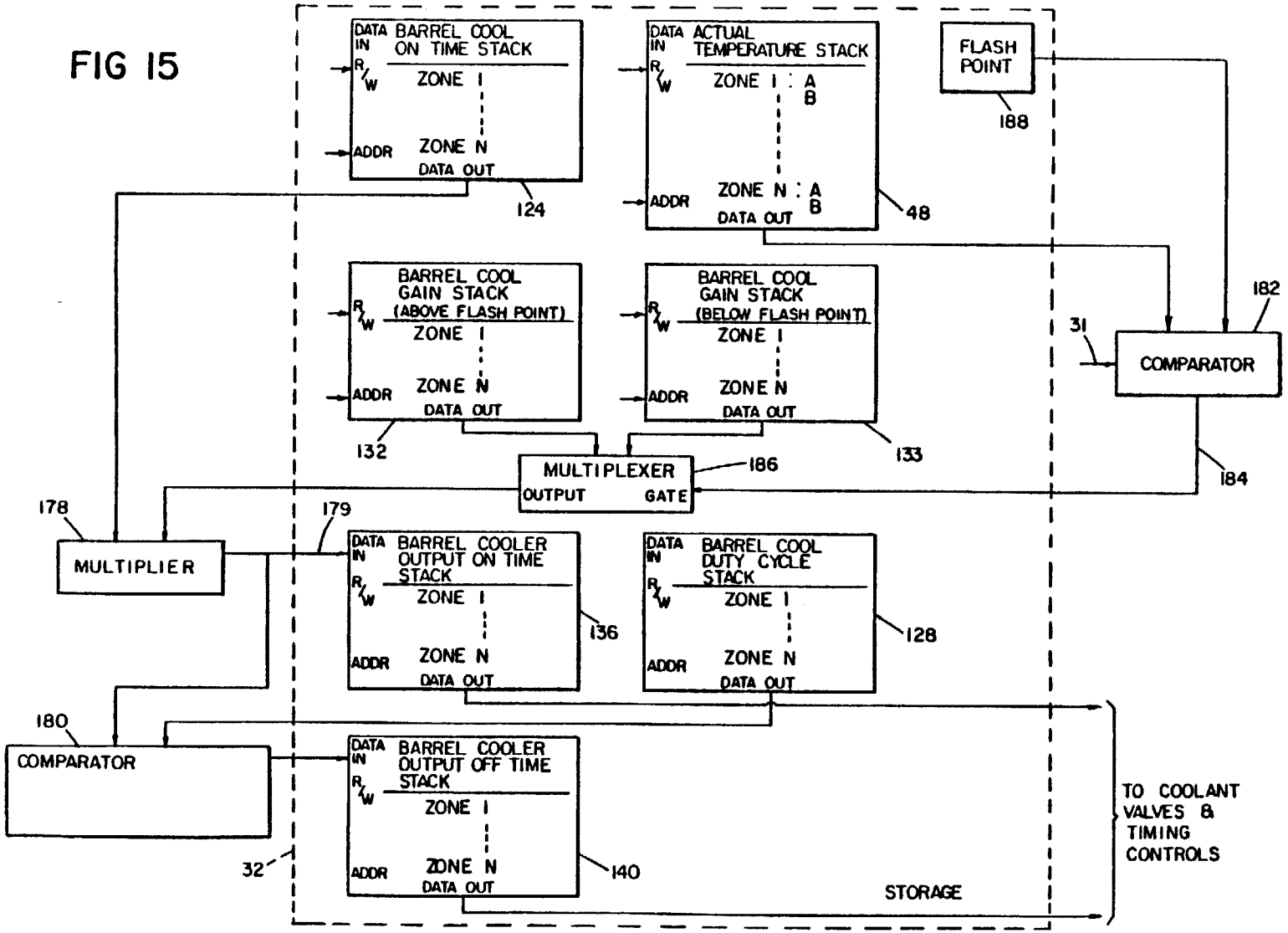

Referring now to FIG. 15, the barrel cool on-time signal stored in stack 124 at the location corresponding to the first barrel zone is applied to multiplier circuit 178. However, in order to provide one of the features of the invention, flash point compensation, the appropriate gain value must be selected. This is accomplished by retrieving from Actual Temperature Stack 48 the signal representative of the B thermocouple (the thermocouple located in the heater/cooler shell) for the first barrel zone, and applying this signal to comparator 182. A signal representative of the flash point temperature (i.e. 212 degrees Fahrenheit or 100 degrees Celsius) is also applied to comparator 182. If the heater temperature is at or above the flash point temperature, it is advantageous to control the coolant valves to cause the water to be pulsed through the coolant system in order to utilize evaporative cooling. (Pulsing involves typical on-times of the order of a tenth of a second.) The cooling capacity of the water is greatly increased by this mode of operation. If the heater temperature is below the flash point temperature, the coolant valves are controlled to cause the water to flow through the coolant system, using typical on-times of three to four seconds.

These two modes of operation are alternatively selected by selecting alternative gain valves. When the B thermocouple temperature signal is less than the flash point signal, the gating signal 184 from comparator 182 gates multiplexer 186 to output a signal selected from stack 133. When the B thermocouple temperature signal is greater than the flash point signal, the gating signal 184 gates multiplexer 186 to output a signal selected from stack 132. The particular signal in either stack is selected by appropriate read/write and address signals from circuit 34, to address the location corresponding to the first barrel zone.

The signal representative of barrel cool on-time from stack 124 is applied to multiplier circuit 178 together with the signal representative of barrel cool gain, from multiplexer 186. Multiplier circuit 178 generates a signal 179 representative of the product, which is applied to Barrel Cooler Output On-Time Stack 136 and is stored in the location corresponding to the first barrel zone, as controlled by appropriate signals from circuit 34. At the same time, the signal 179 from multiplier 178 is applied to comparator 180, together with a signal retrieved from Barrel Cool Duty Cycle Stack 128, at the location corresponding to the first barrel zone. Comparator 180 generates a signal representative of the difference of the applied signals, which is applied to Barrel Cooler Output Off-Time Stack 140 and stored therein at a location corresponding to the first barrel zone.

When signals have been stored in each of stacks 134, 138 (FIG. 14) and 136, 140 (FIG. 15) at locations corresponding to the first barrel zone, sequencer circuit 30 (FIG. 5) causes the stored signals to be output to the heater element power and timing controls and the coolant valves and timing controls. Control signals are updated only at the end of a duty cycle. The design and operation of these controls are entirely conventional and will not be described in detail here.

The elements of controller 12 that have been particularly described in connection with FIGS. 5–15 are composed of standard digital logic elements, which function at high speeds. The controller therefore operates very rapidly. After the A and B thermocouples of the first barrel zone have been read, the entire process of derivation and output of the control signals to the coolant valves, heater element power supply, and timing control of the first barrel zone is typically completed in about ten milliseconds, well before the multiplexer 42 (FIG. 5) is ready to read the A and B thermocouples for the second barrel zone, typically 120 milliseconds later. The process is then repeated for the newly input thermocouple readings, and thereafter cycles through all 2N thermocouples. It will be seen that the controller can respond rapidly and with great sensitivity to changing conditions in the extruder.

Figure 16:
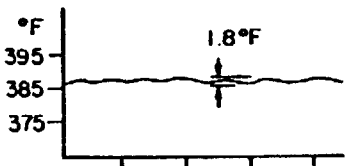
FIG. 16 shows the steady-state temperature fluctuations typical of a system employing the controller of the invention.

The controller of the invention is adapted to maintain the operating temperatures (temperature within the barrel, as measured by thermocouple A) stable after reset, within a range of about ±one degree surrounding the control setpoint, as illustrated in FIG. 16. After reset, the operating temperature will be maintained within about five degrees of the actual setpoint.

What is claimed is:

1. An extruder system having a barrel *having an axis and a plurality of zones at different positions along said axis,* a shell surrounding said barrel *and having a plurality of zones corresponding to said zones of said barrel* and having heat exchange elements *for exchanging heat with said zones of said barrel,* heat exchange element power means, at least one pair of temperature sensitive elements *in each of said plurality of zones,* one of said pair being placed to sense the temperature adjacent the inner surface of said barrel, the other of said pair being placed to sense the temperature of said shell, and a controller having temperature signal input means for receiving an independent temperature signal from [each] *said one temperature sensitive element and for receiving an independent temperature signal from said other temperature sensitive element* of said pair of temperature sensitive elements, setpoint signal input means for inputting a setpoint signal representative of a desired barrel temperature setpoint *for each one of said plurality of zones of said barrel,* storage means for independently storing [each of said input independent temperature signals and] *said independent temperature signal from said one temperature sensitive element, said independent temperature signal from said other temperature sensitive element, and* said input setpoint signal, and control means responsive to said stored input setpoint signal and each of said stored input independent temperature signals *for each of said zones* to derive output signals *for each of said zones, said control means including means responsive to said stored input setpoint signal for providing a control signal for each of said zones, and means responsive to the deviation between said stored input setpoint signal and said stored input temperature signal from said one temperature sensitive element of said pair, for varying said control signal for each of said zones, said control means further including means responsive to said control signals, as varied by said means for varying a control signal, and said stored input temperature signal from said other temperature sensitive element of said pair, for providing said output signals for each of said zones,* said heat exchange element power means being responsive to said output signals automatically to maintain the temperature of *each of* said *zones of said* barrel close to said input setpoint temperature *for each of said zones of said barrel.*

2. An extruder system as claimed in claim 1, wherein said heat exchange elements include both heating and cooling elements and said output signals selectively operate said heating and cooling elements.

3. The extruder of claim 1, wherein said controller further provides heating limit storage providing a limit temperature signal, disable signal means responsive to said stored heating limit temperature signal and said stored temperature signal corresponding to said shell temperature for generating a power disable signal for output to said heat exchange element power means.

4. In an extruder system having a barrel and heat exchange apparatus for said barrel, said apparatus comprising a shell surrounding said barrel, said shell providing heat exchange elements, and heat exchange element power control means, said system further having at least one pair of temperature sensitive elements, one of said pair being placed to sense the temperature adjacent the inner surface of said barrel, the other of said pair being placed to sense the temperature of said shell, that improvement comprising a controller having temperature signal input means for receiving an independent temperature signal from each of said pair of temperature sensitive elements, setpoint signal input means for inputting a setpoint signal representative of a barrel temperature setpoint, storage means for independently storing each of said input independent temperature signals and said input setpoint signal, heat exchange element cycle storage means providing a set of signals representative of a plurality of heat exchange element on and off times, signal deriving means responsive to said stored input setpoint signal and each of said stored input independent temperature signals to derive indexing signals, indexing means responsive to said indexing signals for applying said indexing signals to said heat exchange element cycle storage means to select certain of said stored heat exchange element on and off time signals, and output means for outputting said selected signals to control said heat exchange element power control means, whereby the temperature of said extruder barrel is maintained close to said input setpoint temperature.

5. The controller of claim 4, further having gain signal storage means, said signal deriving means being further responsive to said stored gain signal.

6. In an extruder system having a barrel and apparatus for heating and cooling said barrel, said apparatus comprising a shell surrounding said barrel, said shell providing heater elements and cooling elements, and heater element power control means and cooling element control means, said system further having at least one pair of temperature sensitive elements, one of said pair being placed to sense the temperature adjacent the inner surface of said barrel, the other of said pair being placed to sense the temperature of said shell, that improvement comprising a controller having temperature signal input means for receiving an independent temperature signal from each of said pair of temperature sensitive elements, setpoint signal input means for inputting a setpoint signal representative of a barrel temperature setpoint.

storage means for independently storing each of said input independent temperature signals and said input setpoint signal, heater and cooler cycle storage means providing a set of signals representative of a plurality of heater and cooler on and off times.

signal deriving means responsive to said stored input setpoint signal and each of said stored input independent temperature signals to derive indexing signals, indexing means responsive to said indexing signals for applying said indexing signals to said heater and cooler cycle storage means to select certain of said stored heater and cooler on and off time signals, and output means for outputting said selected signals to control said heater element power control means and said cooling element control means, whereby the temperature of said extruder barrel is maintained close to said input setpoint temperature.

7. The improvement of claim 6, wherein said controller further provides heater element limit temperature storage providing a limit temperature signal, disable signal means responsive to said stored heater element limit temperature signal and said stored temperature signal corresponding to said shell temperature for generating a disable signal for output to said heater element control means.

8. In an extruder system having a barrel and heat exchange apparatus for said barrel, said apparatus comprising a shell surrounding said barrel, said shell providing heat exchange elements, and heat exchange element power control means, said system further having at least one pair of temperature sensitive elements, one of said pair being placed to sense the temperature adjacent the inner surface of said barrel, the other of said pair being placed to sense the temperature of said shell, that improvement comprising a controller having temperature signal input means for receiving an independent temperature signal from each of said pair of temperature sensitive elements, setpoint signal input means for inputting a setpoint signal representative of a barrel temperature setpoint, storage means for independently storing each of said input independent temperature signals and said input setpoint signal, heat exchange element cycle storage means further providing a set of signals representative of a plurality of heat exchange element on and off times and a reset signal, a comparator for comparing each of said stored input independent temperature signals with said stored input setpoint signal for deriving a pair of actual error signals each representative of the difference beween one said input independent signal and said input setpoint signal, reset signal means including a multiplier for deriving a product signal representative of the product of a said actual error signal corresponding to said barrel inner surface temperature, and said stored reset signal, and an adder for deriving a replacement reset signal representative of the sum of said stored reset signal and said product signal, control setpoint signal means including an adder for summing said stored input setpoint signal and said replacement reset signal to derive a control setpoint signal, control error signal means including a comparator for comparing each of said stored input independent temperature signals with said control setpoint signal to derive a pair of control error signals, control sum error means for deriving a control sum error signal representative of a weighted average of said pair of control error signals, indexing means for applying said control sum error signal to select certain of said stored duty cycle time signals and on-time signals, and output means for outputting said selected signals for control of said heat exchange element power control means, whereby the temperature of said extruder barrel is maintained close to said input setpoint temperature.

9. In an extruder system having a barrel and apparatus for heating and cooling said barrel, said apparatus comprising a shell surrounding said barrel, said shell providing heater elements and cooling elements, and heater element power control means and cooling element control means, said system further having at least one pair of temperature sensitive elements, one of said pair being placed to sense the temperature adjacent the inner surface of said barrel, the other of said pair being placed to sense the temperature of said shell, that improvement comprising a controller having temperature signal input means for receiving an independent temperature signal from each of said pair of temperature sensitive elements, setpoint signal input means for inputting a setpoint signal representative of a barrel temperature setpoint, storage means for independently storing each of said input independent temperature signals and said input setpoint signal, heater and cooler cycle storage means further providing a set of signals representative of a plurality of heater and cooler operating cycles on and off times, a reset signal and a reset gain signal, a comparator for comparing each of said stored input independent temperature signals with said stored input setpoint signal for deriving a pair of actual error signals each representative of the difference between one said input independent signal and said input setpoint signal, reset signal means including a multiplier for deriving a product signal representative of the product of a said actual error signal corresponding to said barrel inner surface temperature, and said stored reset signal, and an adder for deriving a replacement reset signal representative of the sum of said stored reset signal and said product signal, control setpoint signal means including an adder for summing said stored input setpoint signal and said replacement reset signal to derive a control setpoint signal, control error signal means including a comparator for comparing each of said stored input independent temperature signals with said control setpoint signal to derive a pair of control error signals, control sum error means for deriving a control sum error signal representative of a weighted average of said pair of control error signals, indexing means for applying said control sum error signal to select certain of said stored operating cycle signals, and output means for outputting said selected operating cycle signals for control of said heater element power control means and said cooling element control means, whereby the temperature of said extruder barrel is maintained close to said input setpoint temperature.

10. The improvement of claim 9, wherein said cooling elements comprise coolant circulation elements, and said cooling element control means comprises coolant circulation control means, said controller further providing flash point storage means for storing a signal representative of the flash point temperature of said coolant, modifying value storage means for storing at least two modifying value signals, a comparator for comparing said stored input temperature signal corresponding to said shell temperature with said stored coolant flash point temperature signal and deriving therefrom a difference signal, and cycle modifying means responsive to said difference signal to select one of said modifying value signals and responsive to said selected modifying value signal to modify said selected cooler operating cycle signal to derive a modified signal for output to said coolant circulation control means.

11. In an extruder system having a barrel and apparatus for cooling said barrel by circulation of a coolant, said apparatus comprising a shell surrounding said barrel, said shell providing coolant circulation elements, and coolant circulation control means, said system further having at least one pair of temperature sensitive elements, one of said pair being placed to sense the temperature adjacent the inner surface of said barrel, the other of said pair being placed to sense the temperature of said shell, that improvement comprising a controller having temperature signal input means for receiving an independent temperature signal from each of said pair of temperature sensitive elements, setpoint signal input means for inputting a setpoint signal representative of a barrel temperature setpoint, storage means for independently storing each of said input independent temperature signals and said input setpoint signal, coolant cycle storage means further providing a set of signals representative of a plurality of coolant circulation control operating cycles, signals deriving means responsive to said stored input setpoint signal and each of said stored input independent temperature signals to derive an indexing signal, indexing means responsive to said indexing signal for applying said indexing signal to said coolant cycle storage means to select a particular said stored operating cycle, output means for outputting said selected signals to said coolant circulation control means, flash point storage means for storing a signal representative of the flash point temperature of said coolant, modifying value storage means for storing at least two modifying value signals, a comparator for comparing said stored input temperature signal corresponding to said shell temperature with said stored coolant flash point temperature signal and deriving therefrom a difference signal, and cycle modifying means responsive to said difference signal to select one of said modifying value signals and responsive to said selected modifying value signal to modify said selected operating cycle signal to derive a modified signal for output to said coolant circulation control means.

12. In an extruder system having a barrel and apparatus for cooling said barrel by circulation of a coolant, said apparatus comprising a shell surrounding said barrel, said shell providing coolant circulation elements, and coolant circulation control means, said system further having at least one pair of temperature sensitive elements, one of said pair being placed to sense the temperature adjacent the inner surface of said barrel, the other of said pair being placed to sense the temperature of said shell, that improvement comprising a controller having temperature signal input means for receiving an independent temperature signal from each of said pair of temperature sensitive elements, setpoint signal input means for inputting a setpoint signal representative of a barrel temperature setpoint, storage means for independently storing each of said input independent temperature signals and said input setpoint signal, coolant cycle storage means providing a set of signals representative of at least two coolant circulation control operating cycles, flash point storage means for storing a signal representative of the flash point temperature of said coolant, a comparator for comparing said stored input temperature signal corresponding to said shell temperature with said stored coolant flash point temperature signal and deriving therefrom a difference signal, and cycle selecting means responsive to said stored input setpoint signal, each of said stored independent temperature signals, and said difference signal to select one of said operating cycle signals for output to said coolant circulation control means.

*13. An extruder system having*

*a barrel having an axis and a plurality of zones at different positions along said axis,*

*a shell surrounding said barrel and having a plurality of zones corresponding to said zones of said barrel, and heat exchange elements for exchanging heat with said zones of said barrel,*

*a heat exchange element power source means,*

*at least one pair of temperature sensitive elements in each of said plurality of zones,*

*a first element of each said pair being placed to sense the temperature adjacent the inner surface of its said barrel zone,*

*the second element of each said pair being placed to sense the temperature of said shell in said zone, and*

*a controller having*

*temperature signal circuit elements for receiving a temperature signal from each of said temperature sensitive elements of said pairs,*

*reference signal circuit elements for providing reference signals each representative of a desired barrel temperature for one of said plurality of zones, and*

*control circuit elements responsive to said reference signals and each of said input temperature signals to derive a separate output signal for each said zone, and to supply said output signals to said heat exchange element power source means to automatically maintain the temperature of said barrel close to said reference signal temperature for each said zone,*

*characterized in that*

*said temperature signal circuit elements receive independently said temperature signals from each of said temperature sensitive elements,*

*storage circuit elements are provided for storing independently each of said temperature signals and each of said reference signals, before supplying them to said control circuit elements, and*

*said control circuit elements are arranged to separately receive at least three control signals for each of said zone comprising*

*a first control signal based on said stored temperature signal from said first element of said pair in said zone,*

*a second control signal based on said stored reference signal for said zone, and*

*a third control signal based on said stored temperature signal from said second element of said pair in said zone,*

*said controller being further characterized in that said control circuit elements include means for varying said second control signal on the basis of the deviation of said stored reference signal compared with said stored temperature signal from said first element of said pair,*

*said controller being still further characterized by having output signal generating means for providing said output signal at least on the basis of the deviation between said second control signal, as varied by said means for varying, and said third control signal.*

*14. The extruder system of claim 13 further characterized in that said output signal generating means provides said output signal for said zone on the basis of a comparison between*

*an algebraic combination of said stored temperature signals from said pair of elements, and*

*said second control signal as varied by said means for varying.*

*15. The extruder system of claim 13 further characterized in that said control circuit elements are arranged to disable said heat exchange element power source means in accordance with a comparison of said stored temperature signal from said second element with a predetermined limit temperature signal.*

*16. The extruder system of claim 13 further comprising means for circulating a coolant in said heat exchange elements, and further characterized in that said control circuit elements are arranged to regulate the circulation of said coolant by said circulating means in accordance with a comparison of said stored temperature signal from said second element with a predetermined signal representative of the flashpoint of said coolant.*

*17. The extruder system of claim 13 further characterized in that said means for varying is arranged to effect a variation of said second control signal only upon the occurrence of predetermined conditions.*

*18. The extruder system of claim 17 further characterized in that said control circuit elements are arranged to determine as the occurrence of one said condition when a predetermined algebraic combination of said stored temperature signals from said pair of elements has remained within a predetermined band for at least a predetermined period of time.*

*19. The extruder system of claim 17 further characterized in that said control circuit elements are arranged to determine as the occurrence of one said condition when the difference between the stored temperature signal from said first element of said pair and said reference signal, as unvaried by said means for varying, is greater than a predetermined amount.*

*20. The extruder system of claim 19 further characterized in that said control circuit elements are arranged to determine as the occurrence of another said condition when a predetermined algebraic combination of said stored temperature signals from said pair of elements has remained within a predetermined band for at least a predetermined period of time, and said variation of said second control signal is effected only upon the simultaneous occurrence of both said conditions.*

*21. The extruder system of claim 17 further characterized in that said control circuit elements are arranged to determine as the occurrence of one said condition when the difference between*

*a predetermined algebraic combination of said stored temperature signals from said pair of elements, and*

*said second control signal as varied by said means for varying, is not smaller than a predetermined amount.*

*22. The extruder system of claim 13*

*wherein said control circuit elements are further arranged to receive a fourth control signal based on said stored temperature signal from said first element in said pair in said zone, and*

*wherein said output signal generating means is arranged for providing said output signal on the further basis of the deviation between said second control signal, as varied by said means for varying, and said fourth control signal.*

* * * * *

UNITED STATES PATENT AND TRADEMARK OFFICE

CERTIFICATE OF CORRECTION

PATENT NO. : Re. 31,903

DATED : June 4, 1985

INVENTOR(S) : Louie M. Faillace

It is certified that error appears in the above-identified patent and that said Letters Patent are hereby corrected as shown below:

Column 3, line 36, "±°" should be --±2°--.

Column 5, line 52, "of ,hermocouples" should be --of thermocouples--.

Column 14, line 3, "the thermocouple" should be --the A thermocouple--.

Column 14, line 27, "barrel zone. The" should be --barrel zone.
The--.

Column 17, line 8, "is applied" should be --is also applied--.

Column 17, line 18, "applied an" should be --applied as--.

Column 19, line 64, "signals" should be --signal--.

Column 21, line 18, "times." should be --times,--.

Column 24, line 7, "signals" should be --signal--.

UNITED STATES PATENT AND TRADEMARK OFFICE

CERTIFICATE OF CORRECTION

PATENT NO. : Re. 31,903

DATED : June 4, 1985

INVENTOR(S) : Louie M. Faillace

It is certified that error appears in the above-identified patent and that said Letters Patent is hereby corrected as shown below:

Column 25, line 41, "each of said" should be

-- each said --.

Signed and Sealed this

Fourteenth Day of October, 1986

[SEAL]

*Attest:*

DONALD J. QUIGG

*Attesting Officer*

*Commissioner of Patents and Trademarks*